(12) United States Patent
Cai et al.

(10) Patent No.: US 10,740,247 B2
(45) Date of Patent: Aug. 11, 2020

(54) METHOD FOR ACCESSING ENTRY IN TRANSLATION LOOKASIDE BUFFER TLB AND PROCESSING CHIP

(71) Applicant: HUAWEI TECHNOLOGIES CO., LTD., Shenzhen, Guangdong (CN)

(72) Inventors: Weiguang Cai, Hangzhou (CN); Xiongli Gu, Hangzhou (CN); Lei Fang, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 58 days.

(21) Appl. No.: 16/211,225

(22) Filed: Dec. 5, 2018

(65) Prior Publication Data
US 2019/0108134 A1 Apr. 11, 2019

Related U.S. Application Data

(63) Continuation of application No. PCT/CN2016/094732, filed on Aug. 11, 2016.

(51) Int. Cl.
*G06F 12/00* (2006.01)
*G06F 13/00* (2006.01)
*G06F 12/1027* (2016.01)

(52) U.S. Cl.
CPC .. *G06F 12/1027* (2013.01); *G06F 2212/1044* (2013.01); *G06F 2212/68* (2013.01)

(58) Field of Classification Search
CPC ......... G06F 12/1027; G06F 2212/1044; G06F 2212/68

(Continued)

(56) References Cited

U.S. PATENT DOCUMENTS 5,465,337 A * 11/1995 Kong ................. G06F 12/1027
711/206
5,479,627 A * 12/1995 Khalidi ............... G06F 12/1027
711/205

(Continued)

FOREIGN PATENT DOCUMENTS

CN 101013404 A 8/2007
CN 101346706 A 1/2009

(Continued)

OTHER PUBLICATIONS

Zhang Qichen et al, TLB Structure and Memory Access Protection Design Based on ARM7TDMI, Chinese Journal of Electron Devices, vol. 31, No. 2, Apr. 2008, 4 pages.

(Continued)

*Primary Examiner* — Sheng Jen Tsai
(74) *Attorney, Agent, or Firm* — Womble Bond Dickinson (US) LLP

(57) ABSTRACT

A method for accessing an entry in a translation lookaside buffer and a processing chip are provided. In the method, the entry includes at least one combination entry, and the combination entry includes a virtual huge page number, a bit vector field, and a physical huge page number. The physical huge page number is an identifier of N consecutive physical pages corresponding to the N consecutive virtual pages. One entry is used to represent a plurality of virtual-to-physical page mappings, so that when a page table length is fixed, a quantity of entries in the TLB can be increased exponentially, thereby increasing a TLB hit probability, and reducing TLB misses. In this way, a delay in program processing can be reduced, and processing efficiency of the processing chip can be improved.

16 Claims, 8 Drawing Sheets

(58) Field of Classification Search
USPC ............................................................ 711/207
See application file for complete search history.

(56) References Cited

U.S. PATENT DOCUMENTS

| | | | | |
|---|---|---|---|---|
| 5,603,047 A * | 2/1997 | Caulk, Jr. | ............ | G06F 9/3001 712/23 |
| 7,884,829 B1 * | 2/2011 | Van Dyke | ............... | G06F 12/10 345/544 |
| 7,932,912 B1 * | 4/2011 | Van Dyke | ............ | G06T 15/005 345/544 |
| 8,072,463 B1 * | 12/2011 | Van Dyke | ............... | G06F 12/10 345/540 |
| 2002/0169936 A1 | 11/2002 | Murphy | | |
| 2003/0182532 A1 * | 9/2003 | Park | ..................... | G06F 12/1027 711/207 |
| 2005/0188175 A1 * | 8/2005 | Chiang | ............... | G06F 12/1036 711/206 |
| 2005/0246480 A1 * | 11/2005 | Fu | ....................... | G06F 12/0246 711/103 |
| 2008/0282055 A1 * | 11/2008 | Yang | .................. | G06F 12/1027 711/207 |
| 2009/0070545 A1 * | 3/2009 | Stecher | ............... | G06F 12/1036 711/205 |
| 2010/0250639 A1 * | 9/2010 | Olson | ................... | G06F 7/4873 708/504 |
| 2011/0231636 A1 * | 9/2011 | Olson | ................... | H03M 13/09 712/222 |
| 2013/0179664 A1 * | 7/2013 | Olson | ................... | G06F 9/3885 712/215 |
| 2014/0189192 A1 | 7/2014 | Raikin et al. | | |
| 2014/0208059 A1 * | 7/2014 | Kogge | ................ | G06F 12/0692 711/203 |
| 2015/0356024 A1 | 12/2015 | Loh | | |
| 2015/0378726 A1 * | 12/2015 | Olson | ................... | G06F 7/4917 712/205 |
| 2020/0036813 A1 * | 1/2020 | Shribman | ........... | H04L 67/2838 |

FOREIGN PATENT DOCUMENTS

| | | |
|---|---|---|
| CN | 101645043 A | 2/2010 |
| CN | 101661437 A | 3/2010 |
| CN | 104516826 A | 4/2015 |
| CN | 104937568 A | 9/2015 |
| CN | 105518631 A | 4/2016 |
| EP | 0805398 A1 | 11/1997 |

OTHER PUBLICATIONS

Taowei Luo et al, Improving TLB Performance by Increasing Hugepage Ratio. 2015 15th IEEE/ACM International Symposium on Cluster, Cloud and Grid Computing, Jul. 9, 2015, 4 pages.

Arkaprava Basu et al, Efficient Virtual Memory for Big Memory Servers. ISCA'13 Tel-Aviv, Israel, Jun. 23-27, 2013 , 12 pages.

Yu Du et al, Supporting superpages in non-contiguous physical memory. 2015 IEEE 21st International Symposium on High Performance Computer Architecture (HPCA), Mar. 9, 2015, 12 pages.

He Jun et al. An Optimization Method of TLB Architecture, Computer Engineering, vol. 38 No. 21, Nov. 2012. total 4 pages. With English abstract.

Binh Pham et al. CoLT: Coalesced Large-Reach TLBs, 2012 IEEE/ACM 45th Annual International Symposium on Microarchitecture, pp. 258-269.

* cited by examiner

US 10,740,247 B2

METHOD FOR ACCESSING ENTRY IN TRANSLATION LOOKASIDE BUFFER TLB AND PROCESSING CHIP

CROSS-REFERENCE TO RELATED APPLICATIONS

This application is a continuation of International Application No. PCT/CN2016/094732, filed on Aug. 11, 2016, the disclosure of which is hereby incorporated by reference in its entirety.

TECHNICAL FIELD

The present disclosure relates to the field of information technologies, and in particular, to a method for accessing an entry in a translation lookaside buffer (TLB) and a processing chip.

BACKGROUND

When compiling a program, a programmer needs to define a code segment start address and a data segment start address. An address of each instruction and an address of each piece of data can be obtained only after these addresses are obtained. A jump instruction and a function call instruction can be executed only after addresses of the instructions are obtained, and a memory access instruction can be executed only after an address of data is obtained.

However, when different programmers compile respective programs, and when one programmer compiles different programs, how to define a code segment start address and a data segment start address of each program becomes a key issue. To address this issue, concepts and technologies of a virtual address and a physical address are introduced.

With a virtual address technology, only a virtual address is displayed to a programmer during programming. In this case, both a code segment start address and a data segment start address of any program are fixed values. In other words, a code segment start address of a program is the same as a code segment start address of another program; and similarly, a data segment start address of a program is also the same as a data segment start address of another program. Therefore, the programmer does not need to define or determine the values of the code segment start address and the data segment start address.

However, when a program starts to be executed, an operating system (OS) searches for a currently available physical address, and maps a virtual address used by the program to the physical address. Therefore, when a plurality of programs are executed at the same time, they are actually at different physical addresses. This ensures normal execution of the programs.

A physical address space in a memory is arranged in unit of a page. When managing the memory, the operating system divides the physical address space into consecutive pages. A virtual address space is also arranged in unit of a page and divided into consecutive pages. The virtual address includes two parts: a virtual page number (VPN) and an intra-page offset. Correspondingly, the physical address also includes two parts: a physical frame number (PFN) (also called a physical page number) and an intra-page offset. Therefore, mapping a virtual address to a physical address is a process of mapping a page number of the virtual address to a page number of the physical address. A mapping relationship from the virtual page number to the physical page number is stored in the memory by using a page table entry. To speed up a process of translating the virtual page number to the physical page number, a part of space, that is, a translation lookaside buffer (TLB), in a cache of a processing chip is allocated to store some page table entries.

Due to limited cache space, a quantity of page table entries stored in the cache is limited. As a result, in a process of translating a virtual address to a physical address by using the page table, a lot of TLB misses occur, that is, a corresponding physical page number for a virtual page number cannot be found in the page table in the cache. This causes a high delay in program processing, and therefore reduces processing efficiency of the processing chip.

SUMMARY

Embodiments of the present disclosure provide a method for accessing an entry in a translation lookaside buffer TLB and a processing chip, to reduce a TLB miss probability, reduce a delay in program processing, and improve processing efficiency of the processing chip.

According to an aspect, an embodiment of a method for accessing an entry in a TLB is provided. In this embodiment, the entry in the TLB has at least one combination entry, that is, one combination entry is used to represent a plurality of virtual-to-physical page mapping relationships. A scenario in which a TLB hit occurs in this case is specifically as follows.

The entry in the TLB includes at least one combination entry, and the combination entry includes a virtual huge page number, a bit vector field, and a physical huge page number, where the virtual huge page number is an identifier of N consecutive virtual pages, the bit vector field includes N bits, the N bits are in a one-to-one correspondence with the N consecutive virtual pages, the N bits are used to identify a page table existence status of the N consecutive virtual pages, respectively, and the physical huge page number is an identifier of N consecutive physical pages corresponding to the N consecutive virtual pages; and the method includes:

receiving a virtual address, and calculating a virtual huge page number of the virtual address and an offset of a virtual page corresponding to the virtual address in a virtual huge page, where the virtual huge page number of the virtual address is obtained by rounding a quotient obtained after a virtual page number of the virtual address is divided by N; the offset of the virtual page corresponding to the virtual address in the virtual huge page is obtained by finding a remainder obtained after the virtual page number of the virtual address is divided by N; and N is an integer greater than 1;

determining whether the virtual huge page number of the virtual address is the same as the virtual huge page number of the combination entry included in the TLB, and determining whether a value of a bit, corresponding to the virtual page corresponding to the virtual address, in the bit vector field of the combination entry is a predetermined value; and if both determining results are yes, determining that a physical page number corresponding to the virtual address is a sum of a product of the physical huge page number of the combination entry and N and the offset of the virtual page corresponding to the virtual address in the virtual huge page.

In this implementation, one entry is used to represent a plurality of virtual-to-physical page mappings, so that when a page table length is fixed, a quantity of entries in the TLB can be increased exponentially, thereby increasing a TLB hit probability, and reducing TLB misses. In this way, a delay in program processing can be reduced, and processing efficiency of the processing chip can be improved.

In another embodiment, one independent entry represents only one virtual-to-physical page mapping relationship. A scenario in which a TLB hit occurs in this case is specifically as follows.

The entry includes at least one independent entry, and the independent entry includes a virtual huge page number, an intra-virtual-huge-page offset, a physical huge page number, and an intra-physical-huge-page offset, where the virtual huge page is composed of N consecutive virtual pages, the virtual huge page number is an identifier of the N consecutive virtual pages, the intra-virtual-huge-page offset is an offset relative to a first virtual page number of the virtual huge page number of the independent entry, the physical huge page is composed of N consecutive physical pages corresponding to the N consecutive virtual pages, the physical huge page number is an identifier of the N consecutive physical pages corresponding to the N consecutive virtual pages, and the intra-physical-huge-page offset is an offset relative to a first physical page number of the physical huge page number of the independent entry; and the method further includes:

determining whether the virtual huge page number of the virtual address is the same as the virtual huge page number of the independent entry included in the TLB, and determining whether the intra-virtual-huge-page offset of the independent entry is the same as the offset of the virtual page corresponding to the virtual address in the virtual huge page; and if both determining results are yes, determining that the physical page number corresponding to the virtual address is a sum of a product of the physical huge page number of the independent entry and N and the intra-physical-huge-page offset of the independent entry.

In this embodiment, when the virtual-to-physical page mapping relationship cannot be represented by using the combination entry, the independent entry is used as a supplement to the combination entry, so as to represent the mapping relationship.

In one embodiment, the combination entry may be used to predict the physical page number. Therefore, when a TLB miss occurs, the virtual huge page number in the combination entry may be hit. In this case, if the combination entry is identified as an entry that can be used for address prediction, the details are specifically as follows:

if the value of the bit, corresponding to the virtual page corresponding to the virtual address, in the bit vector field of the combination entry is not a predetermined value, and the intra-virtual-huge-page offset of the independent entry is different from the offset of the virtual page corresponding to the virtual address in the virtual huge page, the combination entry further includes a flag bit used to indicate whether the combination entry can be used for address prediction; and the method further includes:

if the virtual huge page number of the virtual address is the same as the virtual huge page of the combination entry, and the combination entry includes the flag bit used to indicate that the combination entry can be used for address prediction, determining a predicted page number, performing memory access by using the predicted page, and performing a page table walk, where the predicted page number is the sum of the product of the physical huge page number of the combination entry and N and the offset of the virtual page corresponding to the virtual address in the virtual huge page.

In this embodiment, when a TLB miss occurs, the combination entry is used for address prediction, instead of having to waiting for a page table walk result. This can increase a memory access speed.

In one embodiment, based on correctness of an address prediction result, if the address prediction result is correct, this embodiment of the present disclosure further provides a solution for changing the entry. Specifically, after the performing a page table walk, the method further includes:

if a page table walk result indicates that the predicted page number is correct, changing the value of the bit, corresponding to the offset of the virtual page corresponding to the virtual address in the virtual huge page, in the bit vector field of the combination entry to the predetermined value.

In this embodiment, a new mapping relationship between a virtual page and a physical page is added into the TLB, but no new entry is added. This can reduce overheads of the entry in the TLB.

In one embodiment, based on correctness of an address prediction result, if the address prediction result is incorrect, this embodiment of the present disclosure further provides a solution for changing the entry. Specifically, after the performing a page table walk, the method further includes:

if a page table walk result indicates that the predicted page number is incorrect, setting, in the combination entry, a flag bit used to indicate that the combination entry cannot be used for address prediction.

In this embodiment, the combination entry for which the address prediction result is incorrect is identified as an entry that cannot be used for address prediction, so as to avoid incorrect address prediction.

In one embodiment, based on correctness of an address prediction result, if the address prediction result is incorrect, this embodiment of the present disclosure further provides an implementation solution for adding a new independent entry. Specifically, after it is determined that the page table walk result indicates that the predicted page number is incorrect, the method further includes:

adding a new independent entry, where the new independent entry includes a virtual huge page number, an intra-virtual-huge-page offset, a physical huge page number, and an intra-physical-huge-page offset, where a virtual huge page of the new independent entry is composed of N consecutive virtual pages, the virtual huge page number of the new independent entry is obtained by rounding a quotient obtained after a virtual page number of the virtual address is divided by N, the intra-virtual-huge-page offset of the new independent entry is obtained by finding a remainder obtained after the virtual page number of the virtual address is divided by N, the page table walk result is a real physical page number corresponding to the virtual address, the physical huge page number of the new independent entry is obtained by rounding a quotient obtained after the real physical page number is divided by N, and the intra-physical-huge-page offset of the new independent entry is obtained by finding a remainder obtained after the real physical page number is divided by N.

This embodiment provides the implementation solution for adding a new independent entry in the TLB. The new independent entry cannot be combined with another combination entry or another independent entry. The new independent entry can replace an independent entry in the TLB.

In an optional implementation, this embodiment of the present disclosure further provides a case in which adding a new entry may be avoided when a TLB miss occurs, no address prediction is performed, and the new entry needs to be added. If the physical page number corresponding to the virtual address is not successfully determined by using the TLB, the method further includes:

performing a page table walk to determine a real physical page number corresponding to the virtual address;

determining a target entry to be added, where the target entry includes a virtual huge page number, an intra-virtual-huge-page offset, a physical huge page number, and an intra-physical-huge-page offset, the virtual huge page of the target entry is composed of N consecutive virtual pages, the virtual huge page number of the target entry is obtained by rounding a quotient obtained after a virtual page number of the virtual address is divided by N, the intra-virtual-huge-page offset of the target entry is obtained by finding a remainder obtained after the virtual page number of the virtual address is divided by N, a page table walk result is the real physical page number corresponding to the virtual address, the physical huge page number of the target entry is obtained by rounding a quotient obtained after the real physical page number is divided by N, and the intra-physical-huge-page offset of the target entry is obtained by finding a remainder obtained after the real physical page number is divided by N; and if the virtual huge page number of the independent entry is the same as the virtual huge page number of the target entry, the physical huge page number of the independent entry is the same as the physical huge page number of the target entry, and a difference between the intra-virtual-huge-page offset of the independent entry and the intra-virtual-huge-page offset of the target entry is equal to a difference between the intra-physical-huge-page offset of the independent entry and the intra-physical-huge-page offset of the target entry, combining the independent entry and the target entry into a target combination entry, where the target combination entry includes a virtual huge page number, a bit vector field, and a physical huge page number, the virtual huge page number of the target combination entry is equal to the virtual huge page number of the independent entry, the physical huge page number of the target combination entry is equal to the physical huge page number of the independent entry, a value of a bit, corresponding to a virtual page corresponding to the virtual address, in the bit vector field of the target combination entry is the predetermined value, a value of a bit, corresponding to a virtual page of the independent entry, in the bit vector field of the target combination entry is the predetermined value, and a page number of the virtual page of the independent entry is the sum of the product of the physical huge page number of the independent entry and N and the intra-physical-huge-page offset of the independent entry; or if the virtual huge page number of the independent entry is different from the virtual huge page number of the target entry, the physical huge page number of the independent entry is different from the physical huge page number of the target entry, and a difference between the intra-virtual-huge-page offset of the independent entry and the intra-virtual-huge-page offset of the target entry is not equal to a difference between the intra-physical-huge-page offset of the independent entry and the intra-physical-huge-page offset of the target entry, adding the target entry as a new independent entry.

In this embodiment, that the physical page number corresponding to the virtual address is not successfully determined by using the TLB means that a correspondence from a virtual page number to a physical page number, required for the virtual address, is not stored in the TLB. A specific case may be no virtual huge page number is hit. In this embodiment, a new virtual-to-physical page correspondence is added into the TLB, but no new entry needs to be added into the TLB. This can reduce overheads of the entry and reduce occurrence of the TLB miss.

In one embodiment, to further improve operation efficiency of the processing chip, if N is 2 to the power M, and M is greater than or equal to 1, a huge page number of the virtual address is obtained by shifting the virtual page number of the virtual address to the right by M bits; and/or an offset of the virtual address is obtained by capturing the last M bits of the virtual page number of the virtual address.

In this embodiment, a specific N value is used to implement address operation through shifting and capturing, and relatively complex operations such as multiplication and division are not required, so that the operation efficiency of the processing chip can be improved.

According to a second aspect, a processing chip is provided, and the processing chip includes a translation lookaside buffer TLB and a buffer control unit;

the translation lookaside buffer stores a page table, an entry of the page table includes at least one combination entry, and the combination entry includes a virtual huge page number, a bit vector field, and a physical huge page number, where the virtual huge page number is an identifier of N consecutive virtual pages, the bit vector field includes N bits, the N bits are in a one-to-one correspondence with the N consecutive virtual pages, the N bits are used to identify a page table existence status of the N consecutive virtual pages, respectively, and the physical huge page number is an identifier of N consecutive physical pages corresponding to the N consecutive virtual pages;

the buffer control unit includes a first input end, a first output end, a second input end, and a second output end, where the first input end is configured to receive a virtual address; the first output end is configured to connect to the translation lookaside buffer; the second input end is configured to connect to the translation lookaside buffer; and the second output end is configured to output an entry access result; and the buffer control unit is configured to: receive the virtual address by using the first input end, and calculate a virtual huge page number of the virtual address and an offset of a virtual page corresponding to the virtual address in a virtual huge page, where the virtual huge page number of the virtual address is obtained by rounding a quotient obtained after a virtual page number of the virtual address is divided by N, the offset of the virtual page corresponding to the virtual address in the virtual huge page is obtained by finding a remainder obtained after the virtual page number of the virtual address is divided by N, and N is an integer greater than 1; access the combination page entry by using the first output end, and receive an access result by using the second input end; based on the access result, determine whether the virtual huge page number of the virtual address is the same as the virtual huge page number of the combination entry included in the TLB, and determine whether a value of a bit, corresponding to the virtual page corresponding to the virtual address, in the bit vector field of the combination entry is a predetermined value; and if both determining results are yes, determine that a physical page number corresponding to the virtual address is a sum of a product of the physical huge page number of the combination entry and N and the offset of the virtual page corresponding to the virtual address in the virtual huge page, and output, by using the second output end, the physical page number corresponding to the virtual address.

In one embodiment, the entry of the page table stored in the translation lookaside buffer includes at least one independent entry, and the independent entry includes a virtual huge page number, an intra-virtual-huge-page offset, a physical huge page number, and an intra-physical-huge-page offset, where the virtual huge page is composed of N consecutive virtual pages, the virtual huge page number is an identifier of the N consecutive virtual pages, the intra-virtual-huge-page offset is an offset relative to a first virtual page number of the virtual huge page number of the independent entry, the physical huge page is composed of N consecutive physical pages corresponding to the N consecutive virtual pages, the physical huge page number is an identifier of the N consecutive physical pages corresponding to the N consecutive virtual pages, and the intra-physical-huge-page offset is an offset relative to a first physical page number of the physical huge page number of the independent entry; and the buffer control unit is further configured to: based on the access result, determine whether the virtual huge page number of the virtual address is the same as the virtual huge page number of the independent entry included in the TLB, and determine whether the intra-virtual-huge-page offset of the independent entry is the same as the offset of the virtual page corresponding to the virtual address in the virtual huge page; and if both determining results are yes, determine that the physical page number corresponding to the virtual address is a sum of a product of the physical huge page number of the independent entry and N and the intra-physical-huge-page offset of the independent entry.

In one embodiment, the buffer control unit is further configured to: after determining that the value of the bit, corresponding to the virtual page corresponding to the virtual address, in the bit vector field of the combination entry is not a predetermined value, that the intra-virtual-huge-page offset of the independent entry is different from the offset of the virtual page corresponding to the virtual address in the virtual huge page, and that the combination entry further includes a flag bit used to indicate whether the combination entry can be used for address prediction, if determining that the virtual huge page number of the virtual address is the same as the virtual huge page of the combination entry, and that the combination entry includes a flag bit used to indicate that the combination entry can be used for address prediction, determine a predicted page number, perform memory access by using the predicted page, and perform a page table walk, where the predicted page number is the sum of the product of the physical huge page number of the combination entry and N and the offset of the virtual page corresponding to the virtual address in the virtual huge page.

In one embodiment, the buffer control unit further includes a third input end, where the third input end is configured to receive a page table walk result; and the buffer control unit is further configured to: if the page table walk result indicates that the predicted page number is correct, change the value of the bit, corresponding to the offset of the virtual page corresponding to the virtual address in the virtual huge page, in the bit vector field of the combination entry to the predetermined value by using the first output end.

In one embodiment, the buffer control unit is further configured to: after performing the page table walk, if a page table walk result indicates that the predicted page number is incorrect, set, in the combination entry in the translation lookaside buffer by using the first output end, a flag bit used to indicate that the combination entry cannot be used for address prediction.

In one embodiment, the buffer control unit is further configured to: after determining that the page table walk result indicates that the predicted page number is incorrect, add a new independent entry in the translation lookaside buffer by using the first output end, where the new independent entry includes a virtual huge page number, an intra-virtual-huge-page offset, a physical huge page number, and an intra-physical-huge-page offset, where a virtual huge page of the new independent entry is composed of N consecutive virtual pages, the virtual huge page number of the new independent entry is obtained by rounding a quotient obtained after a virtual page number of the virtual address is divided by N, the intra-virtual-huge-page offset of the new independent entry is obtained by finding a remainder obtained after the virtual page number of the virtual address is divided by N, the page table walk result is a real physical page number corresponding to the virtual address, the physical huge page number of the new independent entry is obtained by rounding a quotient obtained after the real physical page number is divided by N, and the intra-physical-huge-page offset of the new independent entry is obtained by finding a remainder obtained after the real physical page number is divided by N.

In one embodiment, the buffer control unit is further configured to: if the physical page number corresponding to the virtual address is not successfully determined by using the TLB, perform a page table walk to determine a real physical page number corresponding to the virtual address; and determine a target entry to be added, where the target entry includes a virtual huge page number, an intra-virtual-huge-page offset, a physical huge page number, and an intra-physical-huge-page offset, the virtual huge page of the target entry is composed of N consecutive virtual pages, the virtual huge page number of the target entry is obtained by rounding a quotient obtained after a virtual page number of the virtual address is divided by N, the intra-virtual-huge-page offset of the target entry is obtained by finding a remainder obtained after the virtual page number of the virtual address is divided by N, a page table walk result is the real physical page number corresponding to the virtual address, the physical huge page number of the target entry is obtained by rounding a quotient obtained after the real physical page number is divided by N, and the intra-physical-huge-page offset of the target entry is obtained by finding a remainder obtained after the real physical page number is divided by N; and if the virtual huge page number of the independent entry is the same as the virtual huge page number of the target entry, the physical huge page number of the independent entry is the same as the physical huge page number of the target entry, and a difference between the intra-virtual-huge-page offset of the independent entry and the intra-virtual-huge-page offset of the target entry is equal to a difference between the intra-physical-huge-page offset of the independent entry and the intra-physical-huge-page offset of the target entry, combine the independent entry and the target entry that are in the translation lookaside buffer into a target combination entry by using the first output end, where the target combination entry includes a virtual huge page number, a bit vector field, and a physical huge page number, the virtual huge page number of the target combination entry is equal to the virtual huge page number of the independent entry, the physical huge page number of the target combination entry is equal to the physical huge page number of the independent entry, a value of a bit, corresponding to a virtual page corresponding to the virtual address, in the bit vector field of the target combination entry is the predetermined value, a value of a bit, corresponding to a virtual page of the independent entry, in the bit vector field of the target combination entry is the predetermined value, and a page number of the virtual page of the independent entry is the sum of the product of the physical huge page number of the independent entry and N and the intra-physical-huge-page offset of the independent entry; or if the virtual huge page number of the independent entry is different from the virtual huge page number of the target entry, the physical huge page number of the independent entry is different from the physical huge page number of the target entry, and a difference between the intra-virtual-huge-page offset of the independent entry and the intra-virtual-huge-page offset of the target entry is not equal to a difference between the intra-physical-huge-page offset of the independent entry and the intra-physical-huge-page offset of the target entry, add the target entry in the translation lookaside buffer as a new independent entry by using the first output end.

In one embodiment, the buffer control unit is configured to: if N is 2 to the power M, and M is greater than or equal to 1, obtain a huge page number of the virtual address by shifting the virtual page number of the virtual address to the right by M bits; and/or, obtain an offset of the virtual address by capturing the last M bits of the virtual page number of the virtual address.

BRIEF DESCRIPTION OF DRAWINGS

The following briefly describes the accompanying drawings required for describing the embodiments.

DESCRIPTION OF EMBODIMENTS

The following further describes the present disclosure in detail with reference to the accompany drawings.

Before the embodiments of the present disclosure are described, technical background information in the embodiments of the present disclosure is first described.

1. Virtual Address and Physical Address:

All addresses used by a program during execution of the program are virtual addresses. When loading a program into a memory, an operating system allocates an available physical address space, that is, a physical memory space, to the program. The operating system maps, on basis of a page, a virtual address used by the program to a specific physical address. When performing memory management, the operating system divides the physical address space into pages. Similarly, a virtual address space of the program is also divided into pages. Pages corresponding to the virtual address, as well as pages corresponding to the physical address, are sequentially numbered, and the numbers are called page numbers.

So-called address mapping is to map a virtual page to a physical page, that is, replacing a high-order bit of the virtual address with a high-order bit of the physical address.

Figure 1:
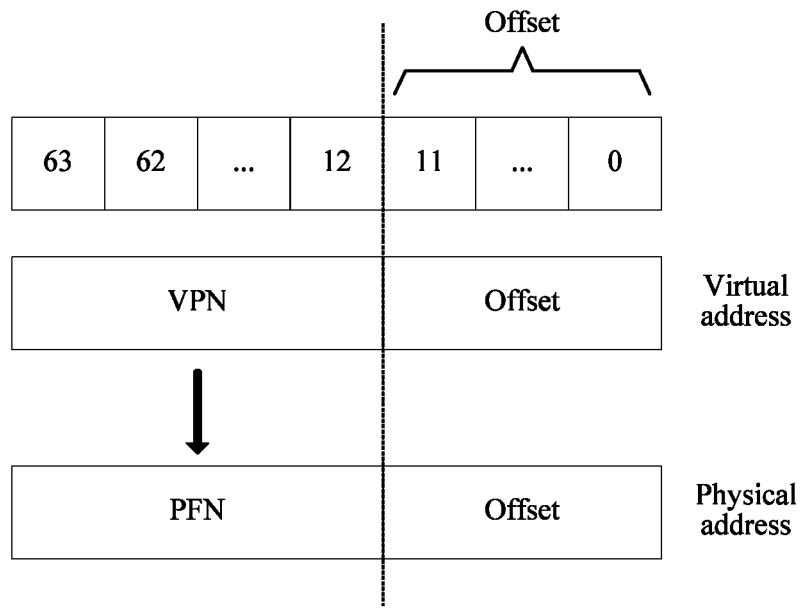
FIG. 1 is a schematic structural diagram of address translation according to an embodiment of the present disclosure.

In this mapping process, as shown in FIG. 1, the virtual address and the physical address each occupy 64 bits, and space occupied by a corresponding page is 4 KB; and 12 low-order bits of the virtual address and 12 low-order bits of the physical address (that is, Addr[11:0]) remain unchanged, that is, the 12 low-order bits of the virtual address are the same as the 12 low-order bits of the physical address. This is because these 12 bits are used to represent an offset in a 4 KB page. A high-order portion of the virtual address and a high-order portion of the physical address, that is, an Addr [63:12] field, are called a VPN in the virtual address and a PFN in the physical address, respectively. A low-order portion of an address, that is, an Addr [11:0] field, is called an offset portion. It can be learned that during the mapping process, the offset portion of the address remains unchanged.

2. TLB:

During running of a program, an operating system establishes a complete mapping relationship from a virtual address to a physical address for the program. This mapping relationship is saved into a data structure called a "page table". Each entry in the page table includes corresponding VPN information and PFN information. Address translation in a processor is usually completed by hardware, and the hardware that implements this function is called a TLB, that is, translation lookaside buffer. The page table can be stored in the TLB.

Figure 2:
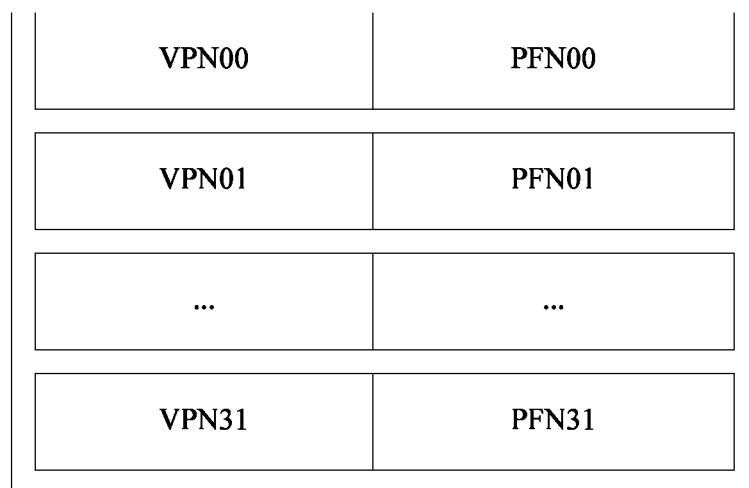
FIG. 2 is a schematic structural diagram of a page table according to an embodiment of the present disclosure.

FIG. 2 shows a general structure of a page table including 32 entries in a TLB. A structure of each entry in the TLB is similar to a structure of each entry in the page table. The TLB may be regarded as a buffer of a page table, and stores a portion of a complete page table.

A VPN is a high-order portion of a virtual address. Using a 64-bit address width (or a 64-bit address) as an example, a virtual address may be represented as Vir_Addr[63:0]. When a size of a page is set to 4 KB, the VPN is represented as Vir_Addr[63:12], that is, the VPN does not include 12 low-order bits of the address. A PFN is a high-order portion of a physical address. Herein, due to a historical reason, the PFN is called a physical frame number, instead of a physical page number. Details are not described herein. When the physical address is 64 bits in width, the physical address may be represented as Phy_Addr[63:0]. When a size of a page is set to 4 KB, the PFN is represented as Phy_Addr [63:121]. It can be learned that the PFN does not include 12 low-order bits of the address.

Figure 3:
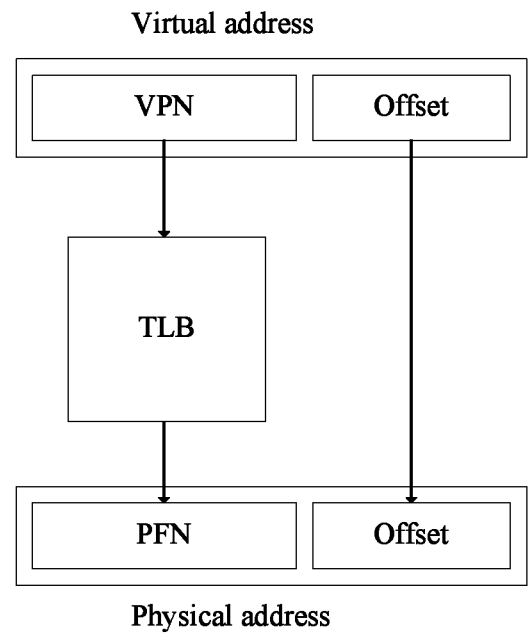
FIG. 3 is a schematic structural diagram of address translation according to an embodiment of the present disclosure.

As shown in FIG. 3, when the processor performs an address fetch operation or a memory access operation, a corresponding virtual address is sent to the TLB. The TLB captures the VPN from the virtual address and compares the VPN with entries in the TLB. If the VPN is the same as a VPN in an entry, a PFN field in the entry is output. It is considered that a TLB hit occurs. If no entry has a VPN the same as the to-be-translated VPN, it is considered that a TLB miss occurs.

A capacity of the TLB is quite limited, and is much smaller than space required for storing a complete page table. A TLB miss often occurs because a large quantity of mapping relationships in the page table are not stored in the TLB. After the TLB miss occurs, a PFN corresponding to the VPN needs to be found in the page table, and then the VPN and PFN information are added into the TLB (usually an existing entry is overwritten). This process is called a page table walk. A page table walk task may be completed automatically by hardware or by the operating system.

3. TLB Miss and Overheads of a TLB Miss:

As a scale of a program increases, both a code segment of the program itself and an amount of data to be processed by the program become increasingly large, and larger address space is required.

In other words, a program uses more pages during running. However, limited by a capacity of the TLB buffer, TLB misses occur more frequently. A recent study shows that when a conventional 4 KB page is used, 50% of a program runtime is used for handling TLB misses.

To reduce a TLB miss frequency, a multi-level TLB structure is applied, in addition to increasing the capacity of the TLB. In the multi-level TLB structure, although a quantity of entries increases with a quantity of levels, an operating frequency is greatly reduced, and a delay time becomes long. In addition to the multi-level TLB structure, another method is to increase space occupied by a page. For example, if a 2 MB page is used, a quantity of pages used by a same program is reduced, so that a quantity of entries in a page table is reduced. This can reduce a TLB miss probability to some extent. However, during program running, after data of a page is swapped from a hard disk into a memory, if the program modifies a piece of data, the page needs to be written into a hard disk for storage (an unmodified page does not need to be written into the hard disk) when the page is swapped out. Larger space occupied by a page indicates a higher probability of being modified and a longer time required to store the entire page in the hard disk. Therefore, effect is not satisfactory.

Based on the descriptions of the foregoing three aspects, it can be learned that currently, a processor performs translation from a virtual address to a physical address by using a TLB, but relatively high TLB miss overheads are caused due to a limited capacity of the TLB. Therefore, the embodiments of the present disclosure are intended to provide a method for reducing TLB misses and overheads thereof. The embodiments of the present disclosure propose a new structure of a page table cached in a TLB, so that an entry of one page table is used for address translation of a plurality of pages, so as to increase a TLB hit probability and reduce TLB misses under a given quantity of entries. In addition, the embodiments of the present disclosure further provide a method for predicting a physical address based on the page table structure proposed in the embodiments of the present disclosure, so that when a TLB miss occurs, a memory access operation can still be performed by using a predicted address while a page table lookup operation is performed. In this way, the memory access operation and a page table walk operation can be performed concurrently. If a prediction result is correct, a processing time is reduced. If a prediction result is incorrect, the memory access operation restarts after the TLB miss, and a delay time is the same as that without using the method provided in the embodiments of the present disclosure. A specific implementation solution includes the following aspects.

Figure 4:
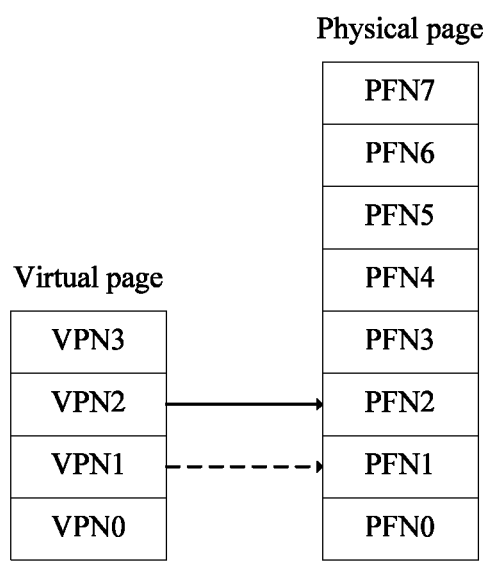
FIG. 4 is a schematic diagram of an address mapping relationship according to an embodiment of the present disclosure.

1. A Structure of an Entry of a Page Table Cached in a TLB:

As shown in FIG. 4, it is assumed that there are four virtual pages VPN0 to VPN3 on the left and physical pages PFN0 to PFN7 on the right. A mapping relationship between the virtual pages and the physical pages is shown by arrows.

Figure 5A:
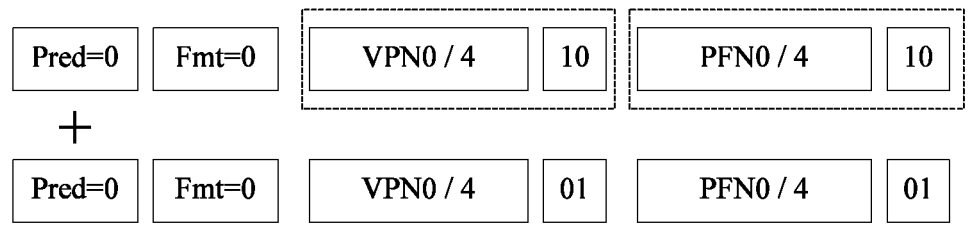
FIG. 5A is a schematic diagram of an entry structure according to an embodiment of the present disclosure.

For representation of the mapping relationship shown by the two arrows, one entry may be used to represent a mapping relationship between a virtual page and a physical page, as shown in FIG. 5A. Because VPN1 and VPN2 are consecutive, and PFN1 and PFN2 are also consecutive, in the embodiments of the present disclosure, one entry may be used to represent the two mapping relationships, as shown in FIG. 5B.

According to the embodiments of the present disclosure, in the entry of the page table cached in the TLB, a 1-bit Fmt field (Format) is added to represent a format of the entry, and a 1-bit Pred field (Prediction) is added to indicate whether the entry can be used to predict a physical address. When the Fmt field is 0, it may indicate that the entry is in a conventional format. In this case, the Pred field is also 0, which means that the entry does not participate in physical address prediction. In this case, one TLB entry can be used to map only one VPN to one PFN. When the Fmt field is 1, it indicates a new format proposed in the embodiments of the present disclosure is used. In this case, one TLB entry can be used to map a plurality of VPNs. The Fmt and Pred fields are mainly used to guide physical address prediction, and details are provided in a section on the physical address prediction in the subsequent embodiments.

For an upper entry in FIG. 5A, a fourth cell "10" from the left is a binary code of "2" of VPN2, and indicates an offset of VPN2 in a virtual huge page "VPN0/4"; and a last cell "10" is a binary code of "2" of PFN2, and indicates an offset of PFN2 in a physical huge page "PFN0/4". A virtual huge page and a physical huge page may be logical concepts. When a storage space is divided into pages, an original solution is still used for dividing the storage space into pages without expanding an address space of a single page. A lower entry in FIG. 5A is used to represent a mapping relationship from VPN1 to PFN1. A principle is the same as that of the mapping relationship from VPN2 to PFN2, and details are not described herein again.

Figure 5B:
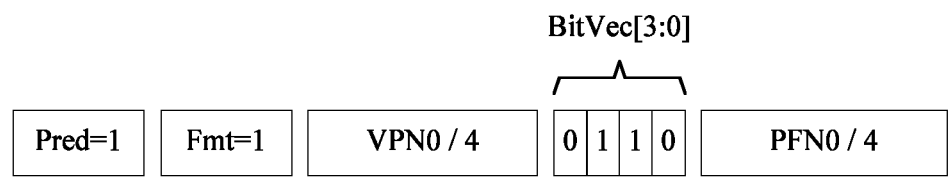
FIG. 5B is a schematic diagram of an entry structure according to an embodiment of the present disclosure.

An entry in FIG. 5B includes a "BitVec" field that has 4 bits, each corresponding to one mapping from a VPN to a PFN. For example, a second bit from the left is 1, representing a mapping relationship from VPN2 to PFN2; a third bit from the left is 1, representing a mapping relationship from VPN1 to PFN1; and the other bits are 0, indicating that a mapping relationship from VPN3 to PFN3 and a mapping relationship from VPN0 to PFN0 are non-determined.

FIG. 5B is an example of an embodiment. This example shows an application scenario in which one entry is used to represent four VPN-to-PFN mapping relationships. Therefore, a value of BitVec is BitVec [3:0], and the virtual huge page and the physical huge page are respectively represented in the entry as "VPN0/4" and "PFN0/4", that is, "0/4" herein.

For generality, the following description is provided by using an example in which one TLB entry may be used to map four VPNs. This is merely for ease of description, and the embodiments of the present disclosure are not limited to a case in which one TLB entry may be used to map four VPNs. For a case in which one TLB entry is used to map other special VPNs, a principle is the same as that of this case, and details are not repeated herein.

In FIG. 5A, a VPN field may be divided into two parts. As shown in a dotted line box of an upper row in FIG. 5A, one part represents two lowest-order bits "10" of the original VPN field, and the other part represents high-order bits "VPN0/4" different from the two lowest-order bits. Similarly, a PFN field may also be divided into two parts, representing two lowest-order bits and remaining high-order bits.

In the example shown in FIG. 4, VPN0 to VPN3 are four virtual pages with consecutive virtual addresses, and PFN0 to PFN3 are four physical pages with consecutive physical addresses. It is assumed that one virtual huge page number represents four consecutive virtual pages. Then, there are the following conversion relationships:

For VPN0, a huge-page number is "VPN0/4", that is, a quotient obtained through rounding after VPN0 is divided by 4; and an offset is "00", that is, a remainder obtained after VPN0 is divided by 4. Calculation manners for other virtual pages and physical pages are similar to this manner, and details are not repeated.

In FIG. 4, VPN1 and VPN2 are corresponding to consecutive virtual addresses, and PFN1 and PFN2 are corresponding to consecutive physical addresses. Therefore, the mapping relationship from VPN2 to PFN2 and the mapping relationship from VPN1 to PFN1 can be combined into one entry, and are marked in the BitVec field, as shown in FIG. 5B.

2. TLB Entry Lookup:

Based on the foregoing description of the structure of the entry in the TLB, a lookup method of the entry in FIG. 5A is not described again. A lookup method of the entry in FIG. 5B is described in detail below.

When an input address is a virtual address (virAddr), a virtual page number of the address, that is, a virtual page number (virPageNum), may be obtained according to virAddr/a page size (pageSize).

In FIG. 4 and FIG. 5B, a mapping from VPN1 to PFN1 is used as an example. The virtual address virAddr is first entered, and virPageNum is calculated according to virAddr/pageSize. Herein, virPageNum is VPN1. Then, VPN0/4 is calculated according to virPageNum/4, and the entry shown in FIG. 5B is obtained through table lookup by using VPN0/4. Then, pageIdx is calculated according to virPageNum % 4. In this case, if pageIdx is 1, a corresponding BitVec[pageIdx] is BitVec[1], corresponding to a second bit from the right. It is found that a value of the bit is 1, and this indicates a TLB hit. A physical huge page number in the entry shown in FIG. 5B is PFN0/4. Therefore, a physical page number corresponding to virPageNum, that is, PFN1, is determined based on an offset 1 in PFN0/4. If a value of BitVec[pageIdx] is 0, it indicates a TLB miss. For example, a first bit from the left of BitVec[3] is 0, and therefore a TLB miss occurs if the entry shown in FIG. 5B is used for VPN3.

Figure 6:
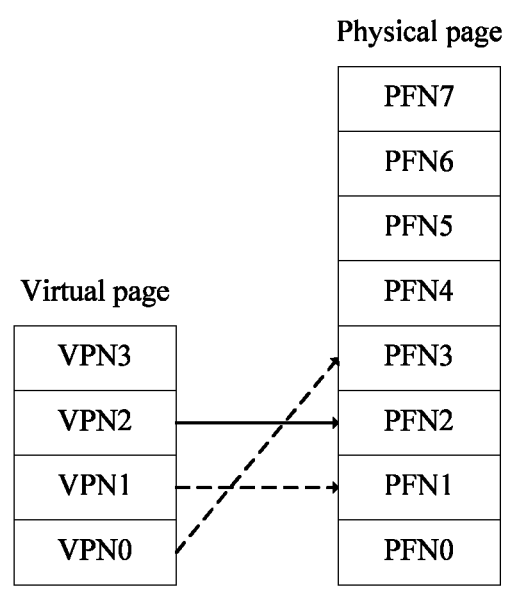
FIG. 6 is a schematic diagram of an address mapping relationship according to an embodiment of the present disclosure.

3. Insertion of a New Entry:

As shown in FIG. 6, it is assumed that on a basis of FIG. 4, a mapping from VPN0 to VPN3 needs to be written into the TLB buffer.

Figure 7:
FIG. 7 is a schematic diagram of an entry structure according to an embodiment of the present disclosure.

If the entry shown in FIG. 5B already exists in the TLB, because VPN1 to VPN2 and PFN1 to PFN2 are consecutive page numbers, while the mapping from VPN0 to VPN3 breaks such consecutiveness, the mapping cannot be added to the entry shown in FIG. 5B, and an entry needs to be added, as shown in FIG. 7. A principle is the same as that in FIG. 5A, and details are not described herein. If VPN0 is mapped to PFN0, merely a value of a first bit from the right of FIG. 5B needs to be changed to 1, and a new entry does not need to be added.

For another example, it is assumed that the upper entry shown in FIG. 5A already exists in the TLB, that is, the mapping relationship from VPN2 to PFN2 has been saved in the entry in the TLB. If VPN0 or VPN1 is accessed in this case, a TLB miss occurs, and a page table walk task is executed. It is assumed that VPN0 is mapped to PFN3 and VPN1 is mapped to PFN1.

Because an offset of VPN1 in VPN0/4 is the same as an offset of PFN1 in PFN0/4, the mapping from VPN1 to PFN1 and the mapping from VPN2 to PFN2 may be saved in one entry in the TLB, that is, the upper entry in FIG. 5A is changed to the format shown in FIG. 5B.

However, an offset of VPN0 in VPN0/4 is different from an offset of PFN3 in PFN0/4. Therefore, the mapping from VPN0 to PFN3 cannot be combined with the existing mapping into one TLB entry like that shown in FIG. 5B, and an independent entry in the TLB needs to be used to represent this mapping, as shown in FIG. 7.

Figure 8A:
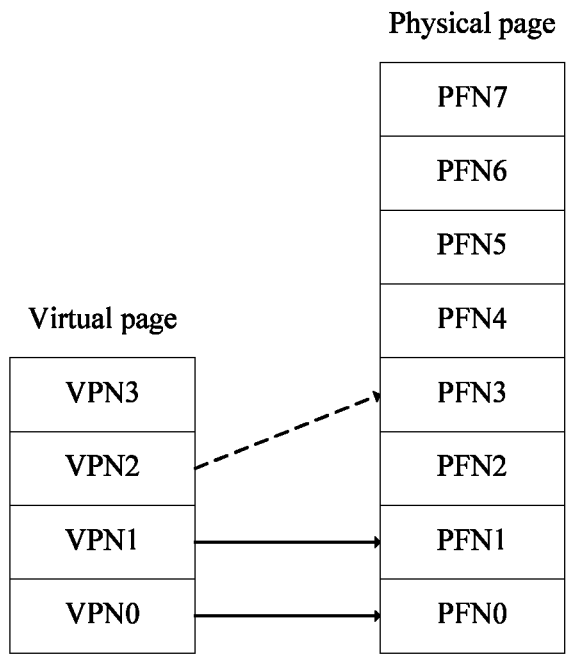
FIG. 8A is a schematic diagram of an address mapping relationship according to an embodiment of the present disclosure.
Figure 8B:
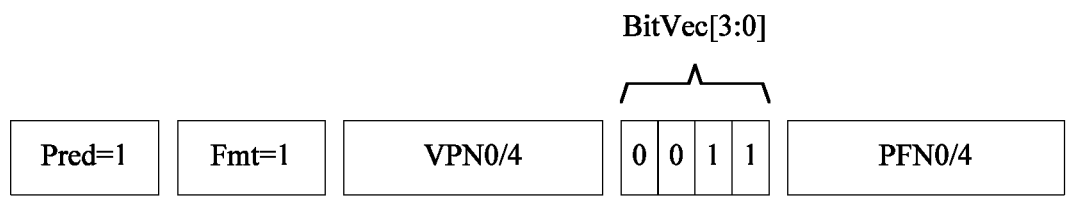
FIG. 8B is a schematic diagram of an entry structure according to an embodiment of the present disclosure.

4. Address Prediction:

As shown in FIG. 8A and FIG. 8B, it is assumed that a mapping from VPN0 to PFN0 and a mapping from VPN1 to PFN1 already exist in a TLB entry, a to-be-translated address is in VPN2, and there is no mapping of VPN2 in the TLB entry. Then, in this case, "a huge page is hit, but a small page is missed".

In this case, if a Pred field is 1, that is, the TLB entry is allowed to be used for prediction, VPN2 is predicted to be mapped to PFN2, that is, a second bit from the left in FIG. 8B is predicted to be 1. In this way, the entry in FIG. 8B may be used to obtain a physical address of VPN2.

After address prediction is performed, two operations are simultaneously performed: One is to perform a memory access operation based on the predicted physical address, and the other is to execute a page table walk task obtain a physical address.

The page table walk task requires a plurality of page table lookup operations, and each page table lookup operation is equivalent to one memory access operation. Therefore, when a result of the page table walk operation is returned, the memory access operation performed based on a predicted address has been completed usually.

If the result of the page table walk indicates that an address prediction result is correct, a result of the memory access operation is available, and this is equivalent to that a delay caused by one memory access operation is reduced. In this case, it can be determined that VPN2 is mapped to VPN2 in FIG. 8A, and a second bit from the left in FIG. 8B may be changed to 1.

Figure 8C:
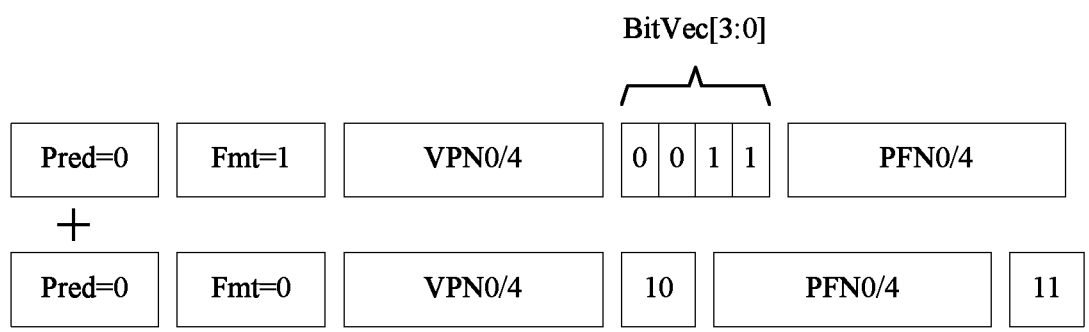
FIG. 8C is a schematic diagram of an entry structure according to an embodiment of the present disclosure.

If the result of the page table walk indicates that an address prediction result is incorrect, for example, as shown in FIG. 8C, VPN2 is actually mapped to PFN3, the returned result of the page table walk result indicates that the previously predicted address is incorrect. In this case, a memory access operation is performed on the correct physical address. In addition, the Pred field in the TLB entry in FIG. 8B is set to 0, indicating that the TLB entry is not used for prediction. Then, a new TLB entry may be inserted to indicate a mapping relationship from VPN2 to PFN3. This TLB entry needs to be represented by using an entry format shown in FIG. 5A, and the Fmt field is 0. Specifically, as shown in FIG. 8C, the added entry is a lower entry in FIG. 8C, and details are not repeated herein.

Figure 9:
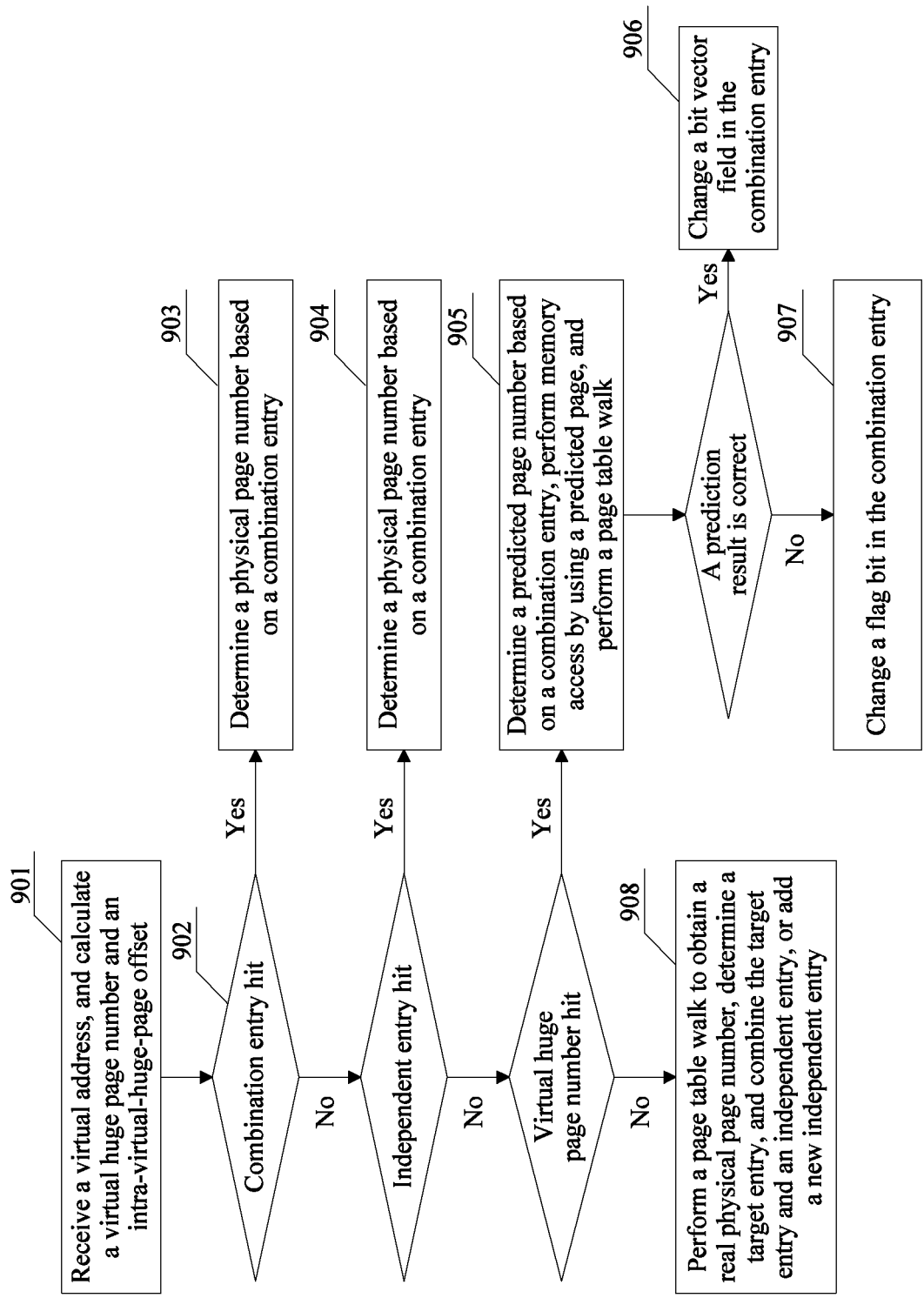
FIG. 9 is a schematic flowchart of a method according to an embodiment of the present disclosure.

An embodiment of the present disclosure provides a method for accessing an entry in a translation lookaside buffer TLB. As shown in FIG. 9, the method includes the following operations.

In this embodiment, the entry in the TLB includes at least one combination entry, and the combination entry includes a virtual huge page number, a bit vector field, and a physical huge page number. The virtual huge page number is an identifier of N consecutive virtual pages. The bit vector field includes N bits, the N bits are in a one-to-one correspondence with the N consecutive virtual pages, and the N bits are used to identify a page table existence status of the N consecutive virtual pages, respectively. The physical huge page number is an identifier of N consecutive physical pages corresponding to the N consecutive virtual pages.

Referring to FIG. 5B, VPN0/4 is corresponding to the virtual huge page number, PFN0/4 is corresponding to the physical huge page number, and BitVec[3:0] is corresponding to the bit vector field. In FIG. 5B, the Pred and Fmt fields may be optional fields when no address prediction is performed. In FIG. 5B, a value of N is 4, or may be another number. Therefore, FIG. 5B is used as an example, and shall not be construed as a uniqueness limitation to this embodiment of the present disclosure.

Operation 901: receiving a virtual address, and calculating a virtual huge page number of the virtual address and an offset of a virtual page corresponding to the virtual address in a virtual huge page, where the virtual huge page number of the virtual address is obtained by rounding a quotient obtained after a virtual page number of the virtual address is divided by N; the offset of the virtual page corresponding to the virtual address in the virtual huge page is obtained by finding a remainder obtained after the virtual page number of the virtual address is divided by N; and N is an integer greater than 1.

For a calculation method of the virtual page corresponding to the virtual address, refer to the foregoing description, and details are not described herein again. In this operation, a virtual address virAddr is entered, and a virtual page number virPageNum is calculated according to virAddr/pageSize; a virtual huge page number is calculated according to virPageNum/N, where in FIG. 5B, the virtual huge page number is VPN0/4, and a value of N is 4; and an entry is queried by using the virtual huge page number. FIG. 4 corresponding to FIG. 5B is used as an example. VPN2 is a virtual page with a virtual page number of 2, a corresponding virtual huge page number is 0, and an offset of VPN2 in a virtual huge page is 2. PFN2 is a physical page with a physical page number of 2, a corresponding physical huge page number is 0, and an offset of PFN2 in a physical huge page is 2.

Operation 902: determining whether the virtual huge page number of the virtual address is the same as the virtual huge page number of the combination entry included in the TLB, and determining whether a value of a bit, corresponding to the virtual page corresponding to the virtual address, in the bit vector field of the combination entry is a predetermined value.

This operation is used to determine whether a combination entry is hit.

Operation 903: if both determining results are yes, determining that a physical page number corresponding to the virtual address is a sum of a product of the physical huge page number of the combination entry and N and the offset of the virtual page corresponding to the virtual address in the virtual huge page.

In this operation, if VPN0/4 is the same as the virtual huge page number in the entry in the TLB, it may be determined that a huge page is hit, and whether a small page is also hit needs to be determined. Therefore, pageIdx needs to be calculated according to virPageNum % 4. In this case, a bit corresponding to pageIdx in the bit vector is BitVec[pageIdx]. If a value of BitVec[pageIdx] is 1, it indicates a TLB hit. It should be noted that alternatively, 0 may be used to indicate a TLB hit, and 1 may be used to indicate a TLB miss. A principle is the same as that of the foregoing representation method, and details are not described herein. If a TLB hit occurs, the physical page number may be specifically determined based on an offset of pageIdx in the physical huge page, or in FIG. 5B, based on an offset of pageIdx in PFN0/4.

In this embodiment of the present disclosure, one entry is used to represent a plurality of virtual-to-physical page mappings, so that when a page table length is fixed, a quantity of entries in the TLB can be increased exponentially, thereby increasing a TLB hit probability, and reducing TLB misses. In this way, a delay in program processing can be reduced, and processing efficiency of a processing chip can be improved.

Still referring to FIG. 9, in operations 901 to 903, there is exactly one combination entry in the entry in the TLB, that is, one combination entry is used to indicate a plurality of virtual-to-physical page mapping relationships. There is also another case: One independent entry indicates only one virtual-to-physical page mapping relationship. For a structure of the independent entry, refer to FIG. 5A. The entry in the TLB includes at least one independent entry, and the independent entry includes a virtual huge page number, an intra-virtual-huge-page offset, a physical huge page number, and an intra-physical-huge-page offset. The virtual huge page is composed of N consecutive virtual pages, the virtual huge page number is an identifier of the N consecutive virtual pages, the intra-virtual-huge-page offset is an offset relative to a first virtual page number of the virtual huge page number of the independent entry, the physical huge page includes N consecutive physical pages corresponding to the N consecutive virtual pages, the physical huge page number is an identifier of the N consecutive physical pages corresponding to the N consecutive virtual pages, and the intra-physical-huge-page offset is an offset relative to a first physical page number of the physical huge page number of the independent entry. The method further includes the following step.

For the independent entry herein, refer to FIG. 5A. Each row represents an independent entry. The upper row is used as an example. The virtual huge page number is corresponding to VPN0/4, and the physical huge page number is corresponding to PFN0/4. The intra-virtual-huge-page offset is "10" contained in the dotted line box on the left. Herein, "10" is a binary number, and an actual offset is 2. The intra-physical-huge-page offset is "10" contained in the dotted line box on the right. Herein, "10" is a binary number, and an actual offset is also 2.

Operation 904: determining whether the virtual huge page number of the virtual address is the same as the virtual huge page number of the independent entry included in the TLB, and determining whether the intra-virtual-huge-page offset of the independent entry is the same as the offset of the virtual page corresponding to the virtual address in the virtual huge page; and if both determining results are yes, determine that the physical page number corresponding to the virtual address is a sum of a product of the physical huge page number of the independent entry and N and the intra-physical-huge-page offset of the independent entry.

This operation may be performed when the combination entry is not hit. In the previous embodiment, when BitVec [pageIdx] is 0, it indicates that the combination entry is not hit, and the independent entry may be hit. According to the example of the upper row in FIG. 5A, VPN0/4 is hit. If pageIdx is exactly the same as a first offset, there is a TLB hit. In this case, PFN0/4 is directly determined as the physical huge page number, the physical page number corresponding to the virtual address is determined based on an offset "10", that is, 2, in the physical huge page. Alternatively, this operation may not be based on a combination entry hit solution in the previous embodiment, that is, operation 904 of this embodiment may exist independently.

There is still another case: A TLB miss really occurs. A sub-case thereof is that a virtual huge page is hit, but a small page is missed. Specifically, the combination entry further includes an identifier used to indicate whether the combination entry can be used for address prediction.

In this case, another two identifiers need to be used in the entry. One identifier is used to indicate whether an entry format is a combination entry or an independent entry. The identifier is corresponding to Fmt in FIG. 5B. The format is used to indicate whether the entry uses a format in FIG. 5B or a format in FIG. 5A. The other identifier is used to indicate whether the entry can be used for address prediction. The identifier is corresponding to Pred in FIG. 5B. This usually occurs when Fmt is the format in FIG. 5B. A value of Fmt may be 0 or may be 1, provided that the value is defined in advance. In FIG. 5B, the value of Fmt is 1. For Pred, whether a value 0 or 1 is used to indicate that address prediction can be performed is also defined in advance, and may be defined randomly.

Based on this application scenario, if the value of the bit, corresponding to the virtual page corresponding to the virtual address, in the bit vector field of the combination entry is not a predetermined value, and the intra-virtual-huge-page offset of the independent entry is different from the offset of the virtual page corresponding to the virtual address in the virtual huge page, the combination entry further includes a flag bit used to indicate whether the combination entry can be used for address prediction; and the method further includes the following step.

Operation 905: if the virtual huge page number of the virtual address is the same as the virtual huge page of the combination entry, and the combination entry includes a flag bit used to indicate that the combination entry can be used for address prediction, determining a predicted page number, perform memory access by using a predicted page, and performing a page table walk, where the predicted page number is the sum of the product of the physical huge page number of the combination entry and N and the offset of the virtual page corresponding to the virtual address in the virtual huge page.

This operation is performed when the combination entry and the independent entry are not hit, the virtual huge page number is hit, and the identifier in the combination entry indicates that address prediction can be performed.

FIG. 5B is used as an example. It is assumed that the calculated virtual huge page number is VPN0/4, that is, the virtual huge page number is hit. If BitVec[pageIdx] is 3, a small page is missed. In this case, it can be predicted that BitVec[3] is 1, that is, a first number from the left of BitVec in FIG. 5B is 1. Then, PFN0/4 is determined to be the physical huge page number, and the physical page number corresponding to the virtual address is determined based on an offset 3 in the physical huge page number. This prediction may be correct or incorrect, and cannot be determined yet. However, a memory access operation may be performed first. In addition, a page table walk may be performed, so as to determine, based on a result of the page table walk, whether a predicted physical page number is correct. The page table walk is an operation process of querying a complete page table, and memory access is usually required to be performed for many times. Therefore, a time required for the page table walk is longer than a time required for performing memory access after the address prediction. This is not described in detail in this embodiment.

If another case of the TLB miss really occurs, that is, a virtual huge page is missed and a virtual small page is also missed, the page table walk can be performed. Details are not described herein.

In the address predication-based implementation, correctness of the address prediction may be determined by using the page table walk result, and after that, entries of the page table in the TLB may be updated. The method further includes the following step.

Operation 906: if a page table walk result indicates that the predicted page number is correct, changing the value of the bit, corresponding to the offset of the virtual page corresponding to the virtual address in the virtual huge page, in the bit vector field of the combination entry to the predetermined value.

In this embodiment, in one case, that is, a result of prediction performed by using the combination entry is correct, only the value of the bit in the bit vector of the combination entry needs to be changed. For example, if the prediction result VPN3 is correct, the first bit from the left in FIG. 5B is changed to 1.

In another case, that is, the prediction result is incorrect, a specific operation is as follows.

Operation 907: if a page table walk result indicates that the predicted page number is incorrect, setting, in the combination entry, a flag bit used to indicate that the combination entry cannot be used for address prediction; and adding a new independent entry, where the new independent entry includes a virtual huge page number, an intra-virtual-huge-page offset, a physical huge page number, and an intra-physical-huge-page offset, where a virtual huge page of the new independent entry is composed of N consecutive virtual pages, the virtual huge page number of the new independent entry is obtained by rounding a quotient obtained after a virtual page number of the virtual address is divided by N, the intra-virtual-huge-page offset of the new independent entry is obtained by finding a remainder obtained after the virtual page number of the virtual address is divided by N, the page table walk result is a real physical page number corresponding to the virtual address, the physical huge page number of the new independent entry is obtained by rounding a quotient obtained after the real physical page number is divided by N, and the intra-physical-huge-page offset of the new independent entry is obtained by finding a remainder obtained after the real physical page number is divided by N.

In this operation, a new independent entry is added. A structure of the new independent entry is the same as that of the independent entry, and details are not repeated in this embodiment.

There is still another case in which the entry of the page table in the TLB needs to be updated. In a special case, when the combination entry is not hit, no address prediction is performed, and the independent entry is not hit, the newly added entry needs to be combined with the existing independent entry with Fmt=0. Specifically, if the physical page number corresponding to the virtual address is not successfully determined by using the foregoing TLB, the method further includes the following operation.

Operation 908: performing a page table walk to determine a real physical page number corresponding to the virtual address;

determining a target entry to be added, where the target entry includes a virtual huge page number, an intra-virtual-huge-page offset, a physical huge page number, and an intra-physical-huge-page offset, the virtual huge page of the target entry is composed of N consecutive virtual pages, the virtual huge page number of the target entry is obtained by rounding a quotient obtained after a virtual page number of the virtual address is divided by N, the intra-virtual-huge-page offset of the target entry is obtained by finding a remainder obtained after the virtual page number of the virtual address is divided by N, a page table walk result is the real physical page number corresponding to the virtual address, the physical huge page number of the target entry is obtained by rounding a quotient obtained after the real physical page number is divided by N, and the intra-physical-huge-page offset of the target entry is obtained by finding a remainder obtained after the real physical page number is divided by N; and if the virtual huge page number of the independent entry is the same as the virtual huge page number of the target entry, the physical huge page number of the independent entry is the same as the physical huge page number of the target entry, and a difference between the intra-virtual-huge-page offset of the independent entry and the intra-virtual-huge-page offset of the target entry is equal to a difference between the intra-physical-huge-page offset of the independent entry and the intra-physical-huge-page offset of the target entry, combine the independent entry and the target entry into a target combination entry, where the target combination entry includes a virtual huge page number, a bit vector field, and a physical huge page number, the virtual huge page number of the target combination entry is equal to the virtual huge page number of the independent entry, the physical huge page number of the target combination entry is equal to the physical huge page number of the independent entry, a value of a bit, corresponding to a virtual page corresponding to the virtual address, in the bit vector field of the target combination entry is the predetermined value, a value of a bit, corresponding to a virtual page of the independent entry, in the bit vector field of the target combination entry is the predetermined value, and a page number of the virtual page of the independent entry is the sum of the product of the physical huge page number of the independent entry and N and the intra-physical-huge-page offset of the independent entry; or if the virtual huge page number of the independent entry is different from the virtual huge page number of the target entry, the physical huge page number of the independent entry is different from the physical huge page number of the target entry, and a difference between the intra-virtual-huge-page offset of the independent entry and the intra-virtual-huge-page offset of the target entry is not equal to a difference between the intra-physical-huge-page offset of the independent entry and the intra-physical-huge-page offset of the target entry, add the target entry as a new independent entry.

In this case, it is assumed that, as shown in FIG. 5A, there is only an independent entry in the upper row in an initial state. Because of a TLB miss, the address prediction or the page table walk is performed, and then a physical page of VPN1, that is, the lower row, is determined. In this case, if two independent entries are used, limited entry resources are wasted. Therefore, the two entries may be combined in a form shown in FIG. 5B.

Based on an address translation feature provided in the foregoing embodiments, if N is 2 to the power M, and M is greater than or equal to 1, calculating a huge page number of the virtual address and an offset of the virtual address includes:

obtaining the huge page number of the virtual address by shifting the virtual page number of the virtual address to the right by M bits; and/or obtaining the offset of the virtual address by capturing the last M bits of the virtual page number of the virtual address.

FIG. 5A is used as an example. If N is 4 and M is 2, the virtual huge page number may be other bits of the virtual page number different from the last two bits; and the offset is the last two bits. If both the virtual huge page number and the offset are applied to calculate the virtual page number, assuming that a page address space is 2 to the power J, the huge page number is other bits different from the last J+2 bits, and the offset is 2 bits after the huge page number. Principles of other values are the same as those described in the foregoing embodiments, and details are not repeated in this embodiment.

Figure 10:
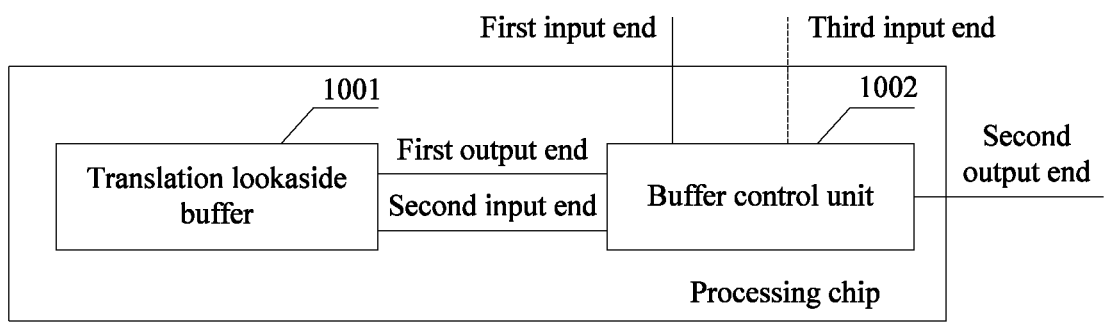
FIG. 10 is a schematic structural diagram of a processing chip according to an embodiment of the present disclosure.

An embodiment of the present disclosure further provides a processing chip. As shown in FIG. 10, the processing chip includes a translation lookaside buffer 1001 and a buffer control unit 1002. The buffer control unit 1002 may further include an input interface and an output interface. An input may include a virtual address, a page table walk result, and the like. An output may include a predicted page (corresponding to a predicted address), a physical page (corresponding to a physical address), and the like.

Referring to FIG. 9, in this embodiment, there is exactly one combination entry in an entry in the TLB, that is, one combination entry is used to indicate a plurality of virtual-to-physical page mapping relationships. A scenario in which a TLB hit occurs in this case is specifically as follows.

The translation lookaside buffer 1001 stores a page table, an entry of the page table includes at least one combination entry, and the combination entry includes a virtual huge page number, a bit vector field, and a physical huge page number. The virtual huge page number is an identifier of N consecutive virtual pages. The bit vector field includes N bits, the N bits are in a one-to-one correspondence with the N consecutive virtual pages, and the N bits are used to identify a page table existence status of the N consecutive virtual pages, respectively. The physical huge page number is an identifier of N consecutive physical pages corresponding to the N consecutive virtual pages.

The buffer control unit 1002 includes a first input end, a first output end, a second input end, and a second output end. The first input end is configured to receive a virtual address. The first output end is configured to connect to the translation lookaside buffer 1001. The second input end is configured to connect to the translation lookaside buffer 1001. The second output end is configured to output an entry access result.

The buffer control unit 1002 is configured to: receive the virtual address by using the first input end, and calculate a virtual huge page number of the virtual address and an offset of a virtual page corresponding to the virtual address in a virtual huge page, where the virtual huge page number of the virtual address is obtained by rounding a quotient obtained after a virtual page number of the virtual address is divided by N, the offset of the virtual page corresponding to the virtual address in the virtual huge page is obtained by finding a remainder obtained after the virtual page number of the virtual address is divided by N, and N is an integer greater than 1; access the combination page entry by using the first output end, and receive an access result by using the second input end; based on the access result, determine whether the virtual huge page number of the virtual address is the same as the virtual huge page number of the combination entry included in the TLB, and determine whether a value of a bit, corresponding to the virtual page corresponding to the virtual address, in the bit vector field of the combination entry is a predetermined value; and if both determining results are yes, determine that a physical page number corresponding to the virtual address is a sum of a product of the physical huge page number of the combination entry and N and the offset of the virtual page corresponding to the virtual address in the virtual huge page, and output, by using the second output end, the physical page number corresponding to the virtual address.

Still referring to FIG. 9, there is still another case: One independent entry indicates only one virtual-to-physical page mapping relationship. For a structure of the independent entry, refer to FIG. 5A. In this case, there is a TLB hit. Specifically, further, the entry of the page table stored in the translation lookaside buffer 1001 includes at least one independent entry, and the independent entry includes a virtual huge page number, an intra-virtual-huge-page offset, a physical huge page number, and an intra-physical-huge-page offset. The virtual huge page is composed of N consecutive virtual pages. The virtual huge page number is an identifier of the N consecutive virtual pages. The intra-virtual-huge-page offset is an offset relative to a first virtual page number of the virtual huge page number of the independent entry. The physical huge page includes N consecutive physical pages corresponding to the N consecutive virtual pages. The physical huge page number is an identifier of the N consecutive physical pages corresponding to the N consecutive virtual pages. The intra-physical-huge-page offset is an offset relative to a first physical page number of the physical huge page number of the independent entry.

The buffer control unit 1002 is further configured to: based on the access result, determine whether the virtual huge page number of the virtual address is the same as the virtual huge page number of the independent entry included in the TLB, and determine whether the intra-virtual-huge-page offset of the independent entry is the same as the offset of the virtual page corresponding to the virtual address in the virtual huge page; and if both determining results are yes, determine that the physical page number corresponding to the virtual address is a sum of a product of the physical huge page number of the independent entry and N and the intra-physical-huge-page offset of the independent entry.

In this embodiment of the present disclosure, the combination entry may be used to predict the physical page number. Therefore, there is such a case: A TLB miss occurs, but the virtual huge page number in the combination table is hit. In this case, if the combination entry is identified as an entry that can be used for address prediction, specifically, the buffer control unit 1002 is further configured to: after determining that the value of the bit, corresponding to the virtual page corresponding to the virtual address, in the bit vector field of the combination entry is not a predetermined value, that the intra-virtual-huge-page offset of the independent entry is different from the offset of the virtual page corresponding to the virtual address in the virtual huge page, and that the combination entry further includes a flag bit used to indicate whether the combination entry can be used for address prediction, if determining that the virtual huge page number of the virtual address is the same as the virtual huge page of the combination entry, and that the combination entry includes a flag bit used to indicate that the combination entry can be used for address prediction, determine a predicted page number, perform memory access by using the predicted page, and perform a page table walk, where the predicted page number is the sum of the product of the physical huge page number of the combination entry and N and the offset of the virtual page corresponding to the virtual address in the virtual huge page.

Based on correctness of an address prediction result, if the address prediction result is correct, this embodiment of the present disclosure further provides a solution for changing the entry. Specifically, the buffer control unit 1002 further includes a third input end, where the third input end is configured to receive a page table walk result.

The buffer control unit 1002 is further configured to: if the page table walk result indicates that the predicted page number is correct, change the value of the bit, corresponding to the offset of the virtual page corresponding to the virtual address in the virtual huge page, in the bit vector field of the combination entry to the predetermined value by using the first output end.

In this embodiment, a new mapping relationship between a virtual page and a physical page is added into the TLB, but no new entry is added. This can reduce overheads of the entry in the TLB.

Based on the correctness of the address prediction result, if the address prediction result is incorrect, this embodiment of the present disclosure further provides a solution for changing the entry. Specifically, the buffer control unit 1002 is further configured to: after performing the page table walk, if the page table walk result indicates that the predicted page number is incorrect, set, in the combination entry in the translation lookaside buffer 1001 by using the first output end, a flag bit used to indicate that the combination entry cannot be used for address prediction.

In this embodiment, the combination entry for which the address prediction result is incorrect is identified as an entry that cannot be used for address prediction, so as to avoid incorrect address prediction.

Based on the correctness of the address prediction, if the address prediction result is incorrect, this embodiment of the present disclosure further provides an implementation solution for adding a new independent entry. Specifically, the buffer control unit 1002 is further configured to: after determining that the page table walk result indicates that the predicted page number is incorrect, add a new independent entry in the translation lookaside buffer 1001 by using the first output end, where the new independent entry includes a virtual huge page number, an intra-virtual-huge-page offset, a physical huge page number, and an intra-physical-huge-page offset.

A virtual huge page of the new independent entry is composed of N consecutive virtual pages. The virtual huge page number of the new independent entry is obtained by rounding a quotient obtained after a virtual page number of the virtual address is divided by N. The intra-virtual-huge-page offset of the new independent entry is obtained by finding a remainder obtained after the virtual page number of the virtual address is divided by N. The page table walk result is a real physical page number corresponding to the virtual address. The physical huge page number of the new independent entry is obtained by rounding a quotient obtained after the real physical page number is divided by N. The intra-physical-huge-page offset of the new independent entry is obtained by finding a remainder obtained after the real physical page number is divided by N.

This embodiment of the present disclosure further provides a case in which adding a new entry may be avoided when a TLB miss occurs, no address prediction is performed, and the new entry needs to be added. Specifically, the buffer control unit 1002 is further configured to: if the physical page number corresponding to the virtual address is not successfully determined by using the TLB, perform a page table walk to determine a real physical page number corresponding to the virtual address; and determine a target entry to be added, where the target entry includes a virtual huge page number, an intra-virtual-huge-page offset, a physical huge page number, and an intra-physical-huge-page offset, the virtual huge page of the target entry is composed of N consecutive virtual pages, the virtual huge page number of the target entry is obtained by rounding a quotient obtained after a virtual page number of the virtual address is divided by N, the intra-virtual-huge-page offset of the target entry is obtained by finding a remainder obtained after the virtual page number of the virtual address is divided by N, a page table walk result is the real physical page number corresponding to the virtual address, the physical huge page number of the target entry is obtained by rounding a quotient obtained after the real physical page number is divided by N, and the intra-physical-huge-page offset of the target entry is obtained by finding a remainder obtained after the real physical page number is divided by N; and if the virtual huge page number of the independent entry is the same as the virtual huge page number of the target entry, the physical huge page number of the independent entry is the same as the physical huge page number of the target entry, and a difference between the intra-virtual-huge-page offset of the independent entry and the intra-virtual-huge-page offset of the target entry is equal to a difference between the intra-physical-huge-page offset of the independent entry and the intra-physical-huge-page offset of the target entry, combine the independent entry and the target entry that are in the translation lookaside buffer 1001 into a target combination entry by using the first output end, where the target combination entry includes a virtual huge page number, a bit vector field, and a physical huge page number, the virtual huge page number of the target combination entry is equal to the virtual huge page number of the independent entry, the physical huge page number of the target combination entry is equal to the physical huge page number of the independent entry, a value of a bit, corresponding to a virtual page corresponding to the virtual address, in the bit vector field of the target combination entry is the predetermined value, a value of a bit, corresponding to a virtual page of the independent entry, in the bit vector field of the target combination entry is the predetermined value, and a page number of the virtual page of the independent entry is the sum of the product of the physical huge page number of the independent entry and N and the intra-physical-huge-page offset of the independent entry; or if the virtual huge page number of the independent entry is different from the virtual huge page number of the target entry, the physical huge page number of the independent entry is different from the physical huge page number of the target entry, and a difference between the intra-virtual-huge-page offset of the independent entry and the intra-virtual-huge-page offset of the target entry is not equal to a difference between the intra-physical-huge-page offset of the independent entry and the intra-physical-huge-page offset of the target entry, add the target entry in the translation lookaside buffer 1001 as a new independent entry by using the first output end.

In this embodiment, that the physical page number corresponding to the virtual address is not successfully determined by using the TLB means that a correspondence from a virtual page number to a physical page number, required for the virtual address, is not stored in the TLB. A specific case may be no virtual huge page number is hit.

To further increase operation efficiency of the processing chip, the buffer control unit 1002 is configured to: if N is 2 to the power M, and M is greater than or equal to 1, obtain a huge page number of the virtual address by shifting the virtual page number of the virtual address to the right by M bits; and/or, obtain an offset of the virtual address by capturing the last M bits of the virtual page number of the virtual address.

Figure 11:
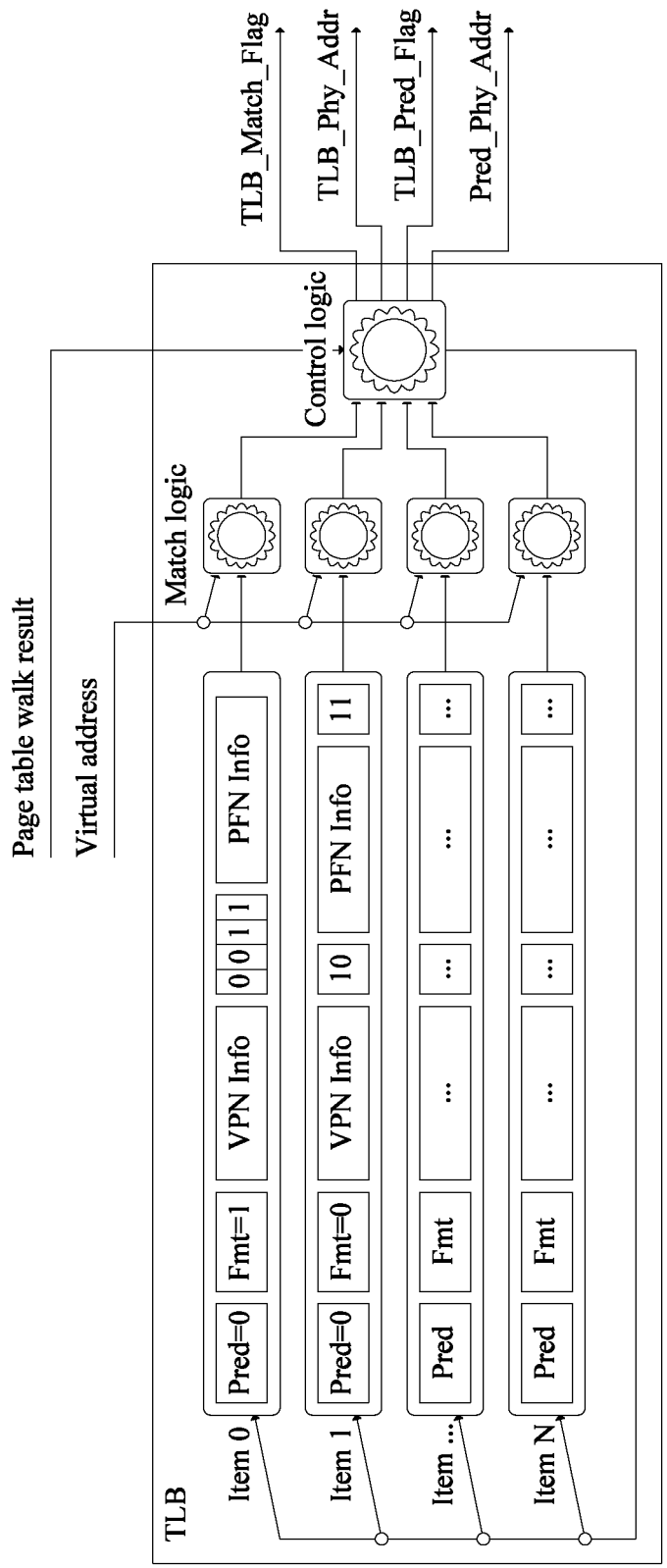
FIG. 11 is a schematic structural diagram of a TLB in a processing chip according to an embodiment of the present disclosure.

A shift operation may be implemented by using a shift register, and a result may be determined by using a logic gate circuit. All functions in the foregoing steps may be implemented by using a logic circuit. There are various logic circuit layouts. This is not uniquely described in this embodiment of the present disclosure. In a specific example, an embodiment of the present disclosure further provides another processing chip. The processing chip includes a TLB and a control structure thereof. As shown in FIG. 11, and the control structure mainly includes a match logic and a control logic. These two parts may be corresponding to the buffer control unit 1002 in the structure shown in FIG. 10.

Input content mainly includes a page table walk result and a virtual address, which are not mandatory. Descriptions are provided in the subsequent process.

In FIG. 11, Item 0 to Item N indicate entries in the TLB. This portion may be corresponding to the cache in the structure shown in FIG. 10.

The virtual address is an input signal of the TLB, indicating a to-be-translated virtual address.

Each entry in the TLB has a match logic. Based on the input virtual address and content of the entry in the TLB by using the method described in the method section, the match logic determines whether the virtual address matches the entry in the TLB; and if the virtual address does not match the entry in the TLB, determines whether prediction can be performed; or if the virtual address matches the entry in the TLB, outputs PFN information (Info) of the entry; or if the virtual address does not match the entry in the TLB but prediction can be performed, outputs predicted PFN information, and the like.

There is a control logic in the TLB. The control logic outputs four signals based on an output result of each entry in the TLB: TLB_Match_Flag (used to indicate whether a physical address is valid), TLB_Phy_Addr (a physical address), TLB_Pred_Flag (used to indicate whether a predicted address is valid), and Pred_Phy_Addr (a predicted physical address). If there is a TLB hit, only the first two signals may be output; and if the address prediction is performed, only the last two signals may be output.

If TLB_Match_Flag is valid, it indicates a TLB hit, and TLB_Phy_Addr represents a physical address corresponding to the input virtual address. If TLB_Match_Flag is invalid but TLB_Pred_Flag is valid, Pred_Phy_Addr represents the predicted physical address.

When there is a TLB miss, the control logic updates the entries in the TLB based on the page table walk result and content of current entries by using the algorithm in the method section.

In this embodiment, the physical address may be a physical page number, or may be a more accurate physical address obtained by further calculation based on the physical page number and an intra-physical-page offset, and may be correspondingly set based on different address access management system settings. This is not uniquely limited in this embodiment of the present disclosure. For the foregoing technical content in the processing chip embodiment, refer to the descriptions in the method embodiment, and details are not described herein again.

It should be noted that, the apparatus division is merely logical function division, but is not limited to the foregoing division, as long as corresponding functions can be implemented. In addition, specific names of the functional units are merely provided for the purpose of distinguishing the units from one another, but are not intended to limit the protection scope of the present disclosure.

In addition, a person of ordinary skill in the art may understand that all or a part of the steps of the method embodiments may be implemented by a program instructing relevant hardware. The program may be stored in a computer readable storage medium. The storage medium may be a read-only memory, a magnetic disk, an optical disc, or the like.

The foregoing descriptions are merely example implementations of the present disclosure, but are not intended to limit the protection scope of the present disclosure. Any variation or replacement readily figured out by a person skilled in the art within the technical scope disclosed in the embodiments of the present disclosure shall fall within the protection scope of the present disclosure. Therefore, the protection scope of the present disclosure shall be subject to the protection scope of the claims.

What is claimed is:

1. A method for accessing an entry in a translation lookaside buffer (TLB), the method comprising:
   receiving a first virtual address, wherein the entry of the TLB comprises at least one combination entry having a virtual huge page number, a bit vector field, and a physical huge page number, wherein the virtual huge page number is an identifier of N consecutive virtual pages, the bit vector field comprises N bits corresponding to the N consecutive virtual pages, the N bits are used to identify a page table existence status of the N consecutive virtual pages, respectively, and the physical huge page number is an identifier of N consecutive physical pages corresponding to the N consecutive virtual pages;
   calculating a virtual huge page number of the first virtual address and an offset of a virtual page corresponding to the first virtual address in a virtual huge page, wherein the virtual huge page number of the first virtual address is obtained by rounding a quotient obtained after a virtual page number of the first virtual address is divided by N; the offset of the virtual page corresponding to the first virtual address in the virtual huge page is obtained by finding a remainder obtained after the virtual page number of the first virtual address is divided by N; and N is an integer greater than 1;
   determining that the virtual huge page number of the first virtual address is the same as the virtual huge page number of the combination entry comprised in the TLB, and determining that a value of a bit, corresponding to the virtual page corresponding to the first virtual address, in the bit vector field of the combination entry is a predetermined value; and
   determining that a physical page number corresponding to the first virtual address is a sum of a product of the physical huge page number of the combination entry and N and the offset of the virtual page corresponding to the first virtual address in the virtual huge page.

2. The method according to claim 1, wherein the entry comprises at least one independent entry having a virtual huge page number, an intra-virtual-huge-page offset, a physical huge page number, and an intra-physical-huge-page offset, wherein the virtual huge page is composed of N consecutive virtual pages, the intra-virtual-huge-page offset is an offset relative to a first virtual page number of the virtual huge page number of the independent entry, the physical huge page is composed of N consecutive physical pages corresponding to the N consecutive virtual pages, and the intra-physical-huge-page offset is an offset relative to a first physical page number of the physical huge page number of the independent entry; and the method further comprises:
   determining that the virtual huge page number of the first virtual address is the same as the virtual huge page number of the independent entry comprised in the TLB, and determining that the intra-virtual-huge-page offset of the independent entry is the same as the offset of the virtual page corresponding to the first virtual address in the virtual huge page; and
   determining that the physical page number corresponding to the first virtual address is a sum of a product of the physical huge page number of the independent entry and N and the intra-physical-huge-page offset of the independent entry.

3. The method according to claim 2, further comprising:
   receiving a second virtual address, and calculating a virtual huge page number of the second virtual address and an offset of a virtual page corresponding to the second virtual address in a virtual huge page, wherein the virtual huge page number of the second virtual address is obtained by rounding a quotient obtained after a virtual page number of the second virtual address is divided by N; the offset of the virtual page corresponding to the second virtual address in the virtual huge page is obtained by finding a remainder obtained after the virtual page number of the second virtual address is divided by N; and N is an integer greater than 1;

determining that the value of the bit, corresponding to the virtual page corresponding to the second virtual address, in the bit vector field of the combination entry is not a predetermined value, and the intra-virtual-huge-page offset of the independent entry is different from the offset of the virtual page corresponding to the second virtual address in the virtual huge page, the combination entry further comprises a flag bit used to indicate whether the combination entry can be used for address prediction;

in response to determining that the virtual huge page number of the second virtual address is the same as the virtual huge page number of the combination entry, and the combination entry comprises the flag bit used to indicate that the combination entry can be used for address prediction, determining a predicted page number, performing memory access by using a predicted page, and performing a page table walk, wherein the predicted page number is the sum of the product of the physical huge page number of the combination entry and N and the offset of the virtual page corresponding to the second virtual address in the virtual huge page.

4. The method according to claim 3, wherein after the performing a page table walk, the method further comprises:

in response to determining that a page table walk result indicates that the predicted page number is correct, changing the value of the bit, corresponding to the offset of the virtual page corresponding to the second virtual address in the virtual huge page, in the bit vector field of the combination entry to the predetermined value.

5. The method according to claim 3, wherein after the performing a page table walk, the method further comprises:

in response to determining that a page table walk result indicate that the predicted page number is incorrect, setting, in the combination entry, a flag bit used to indicate that the combination entry cannot be used for address prediction.

6. The method according to claim 5, further comprising:
determining that the page table walk result indicates that the predicted page number is incorrect;

adding a new independent entry having a virtual huge page number, an intra-virtual-huge-page offset, a physical huge page number, and an intra-physical-huge-page offset, wherein a virtual huge page of the new independent entry is composed of N consecutive virtual pages, the virtual huge page number of the new independent entry is obtained by rounding a quotient obtained after a virtual page number of the second virtual address is divided by N, the intra-virtual-huge-page offset of the new independent entry is obtained by finding a remainder obtained after the virtual page number of the second virtual address is divided by N, the page table walk result is a real physical page number corresponding to the second virtual address, the physical huge page number of the new independent entry is obtained by rounding a quotient obtained after the real physical page number is divided by N, and the intra-physical-huge-page offset of the new independent entry is obtained by finding a remainder obtained after the real physical page number is divided by N.

7. The method according to claim 2, further comprising:
determining that the physical page number corresponding to the first virtual address is not successfully determined by using the TLB;

performing a page table walk to determine a real physical page number corresponding to the first virtual address;

determining a target entry to be added, wherein the target entry comprises a virtual huge page number, an intra-virtual-huge-page offset, a physical huge page number, and an intra-physical-huge-page offset, the virtual huge page of the target entry is composed of N consecutive virtual pages, the virtual huge page number of the target entry is obtained by rounding a quotient obtained after a virtual page number of the first virtual address is divided by N, the intra-virtual-huge-page offset of the target entry is obtained by finding a remainder obtained after the virtual page number of the first virtual address is divided by N, a page table walk result is the real physical page number corresponding to the first virtual address, the physical huge page number of the target entry is obtained by rounding a quotient obtained after the real physical page number is divided by N, and the intra-physical-huge-page offset of the target entry is obtained by finding a remainder obtained after the real physical page number is divided by N; and in response to determining that the virtual huge page number of the independent entry is the same as the virtual huge page number of the target entry, the physical huge page number of the independent entry is the same as the physical huge page number of the target entry, and a difference between the intra-virtual-huge-page offset of the independent entry and the intra-virtual-huge-page offset of the target entry is equal to a difference between the intra-physical-huge-page offset of the independent entry and the intra-physical-huge-page offset of the target entry, combining the independent entry and the target entry into a target combination entry, wherein the target combination entry comprises a virtual huge page number, a bit vector field, and a physical huge page number, the virtual huge page number of the target combination entry is equal to the virtual huge page number of the independent entry, the physical huge page number of the target combination entry is equal to the physical huge page number of the independent entry, a value of a bit, corresponding to a virtual page corresponding to the first virtual address, in the bit vector field of the target combination entry is the predetermined value, a value of a bit, corresponding to a virtual page of the independent entry, in the bit vector field of the target combination entry is the predetermined value, and a page number of the virtual page of the independent entry is the sum of the product of the physical huge page number of the independent entry and N and the intra-physical-huge-page offset of the independent entry.

8. The method according to claim 1, wherein N is 2 to the power M, and M is greater than or equal to 1, a huge page number of the first virtual address is obtained by shifting the virtual page number of the virtual address to the right by M bits; and an offset of first the virtual address is obtained by capturing the last M bits of the virtual page number of the first virtual address.

9. A processing chip, wherein the processing chip comprises a translation lookaside buffer (TLB) and a buffer control unit;

wherein the translation lookaside buffer stores a page table, an entry of the page table comprises at least one combination entry, and the combination entry comprises a virtual huge page number, a bit vector field, and a physical huge page number, wherein the virtual huge page number is an identifier of N consecutive virtual pages, the bit vector field comprises N bits corresponding to the N consecutive virtual pages, the N bits are used to identify a page table existence status of the N consecutive virtual pages, respectively, and the physical huge page number is an identifier of N consecutive physical pages corresponding to the N consecutive virtual pages;

the buffer control unit comprises a first input end, a first output end, a second input end, and a second output end, wherein the first input end is configured to receive a first virtual address; the first output end is configured to connect to the translation lookaside buffer; the second input end is configured to connect to the translation lookaside buffer; and the second output end is configured to output an entry access result; and the buffer control unit is configured to:
receive the first virtual address by using the first input end, and calculate a virtual huge page number of the first virtual address and an offset of a virtual page corresponding to the first virtual address in a virtual huge page, wherein the virtual huge page number of the first virtual address is obtained by rounding a quotient obtained after a virtual page number of the first virtual address is divided by N, the offset of the virtual page corresponding to the first virtual address in the virtual huge page is obtained by finding a remainder obtained after the virtual page number of the first virtual address is divided by N, and N is an integer greater than 1;

access the combination page entry by using the first output end, and receive an access result by using the second input end;

based on the access result, determine that the virtual huge page number of the first virtual address is the same as the virtual huge page number of the combination entry comprised in the TLB, and determine that a value of a bit, corresponding to the virtual page corresponding to the first virtual address, in the bit vector field of the combination entry is a predetermined value;

determine that a physical page number corresponding to the first virtual address is a sum of a product of the physical huge page number of the combination entry and N and the offset of the virtual page corresponding to the first virtual address in the virtual huge page, and output, by using the second output end, the physical page number corresponding to the first virtual address.

10. The processing chip according to claim 9, wherein the entry of the page table stored in the translation lookaside buffer comprises at least one independent entry having a virtual huge page number, an intra-virtual-huge-page offset, a physical huge page number, and an intra-physical-huge-page offset, wherein the virtual huge page is composed of N consecutive virtual pages, the intra-virtual-huge-page offset is an offset relative to a first virtual page number of the virtual huge page number of the independent entry, the physical huge page is composed of N consecutive physical pages corresponding to the N consecutive virtual pages, and the intra-physical-huge-page offset is an offset relative to a first physical page number of the physical huge page number of the independent entry; and the buffer control unit is further configured to:
based on the access result, determine that the virtual huge page number of the first virtual address is the same as the virtual huge page number of the independent entry comprised in the TLB, and determine that the intra-virtual-huge-page offset of the independent entry is the same as the offset of the virtual page corresponding to the first virtual address in the virtual huge page;

determine that the physical page number corresponding to the first virtual address is a sum of a product of the physical huge page number of the independent entry and N and the intra-physical-huge-page offset of the independent entry.

11. The processing chip according to claim 10, wherein the buffer control unit is further configured to:
receive a second virtual address, and calculate a virtual huge page number of the second virtual address and an offset of a virtual page corresponding to the second virtual address in a virtual huge page, wherein the virtual huge page number of the second virtual address is obtained by rounding a quotient obtained after a virtual page number of the second virtual address is divided by N; the offset of the virtual page corresponding to the second virtual address in the virtual huge page is obtained by finding a remainder obtained after the virtual page number of the second virtual address is divided by N; and N is an integer greater than 1;

determine that the value of the bit, corresponding to the virtual page corresponding to the second virtual address, in the bit vector field of the combination entry is not a predetermined value, that the intra-virtual-huge-page offset of the independent entry is different from the offset of the virtual page corresponding to the second virtual address in the virtual huge page, and that the combination entry further comprises a flag bit used to indicate whether the combination entry can be used for address prediction;

in response to determining that the virtual huge page number of the second virtual address is the same as the virtual huge page of the combination entry, and that the combination entry comprises a flag bit used to indicate that the combination entry can be used for address prediction, determine a predicted page number, perform memory access by using the predicted page, and perform a page table walk, wherein the predicted page number is the sum of the product of the physical huge page number of the combination entry and N and the offset of the virtual page corresponding to the second virtual address in the virtual huge page.

12. The processing chip according to claim 11, wherein the buffer control unit further comprises a third input end, wherein the third input end is configured to receive a page table walk result; and the buffer control unit is further configured to:
determine that the page table walk result indicates that the predicted page number is correct,
change the value of the bit, corresponding to the offset of the virtual page corresponding to the second virtual address in the virtual huge page, in the bit vector field of the combination entry to the predetermined value by using the first output end.

13. The processing chip according to claim 11, wherein the buffer control unit is further configured to:

after performing the page table walk, determine that a page table walk result indicates that the predicted page number is incorrect, set, in the combination entry in the translation lookaside buffer by using the first output end, a flag bit used to indicate that the combination entry cannot be used for address prediction.

14. The processing chip according to claim 13, wherein the buffer control unit is further configured to:

after determining that the page table walk result indicates that the predicted page number is incorrect, add a new independent entry in the translation lookaside buffer by using the first output end, wherein the new independent entry comprises a virtual huge page number, an intra-virtual-huge-page offset, a physical huge page number, and an intra-physical-huge-page offset, wherein a virtual huge page of the new independent entry is composed of N consecutive virtual pages, the virtual huge page number of the new independent entry is obtained by rounding a quotient obtained after a virtual page number of the second virtual address is divided by N, the intra-virtual-huge-page offset of the new independent entry is obtained by finding a remainder obtained after the virtual page number of the second virtual address is divided by N, the page table walk result is a real physical page number corresponding to the second virtual address, the physical huge page number of the new independent entry is obtained by rounding a quotient obtained after the real physical page number is divided by N, and the intra-physical-huge-page offset of the new independent entry is obtained by finding a remainder obtained after the real physical page number is divided by N.

15. The processing chip according to claim 10, wherein the buffer control unit is further configured to:

in response to determining that the physical page number corresponding to the first virtual address is not successfully determined by using the TLB, perform a page table walk to determine a real physical page number corresponding to the first virtual address; and determine a target entry to be added, wherein the target entry comprises a virtual huge page number, an intra-virtual-huge-page offset, a physical huge page number, and an intra-physical-huge-page offset, the virtual huge page of the target entry is composed of N consecutive virtual pages, the virtual huge page number of the target entry is obtained by rounding a quotient obtained after a virtual page number of the first virtual address is divided by N, the intra-virtual-huge-page offset of the target entry is obtained by finding a remainder obtained after the virtual page number of the first virtual address is divided by N, a page table walk result is the real physical page number corresponding to the first virtual address, the physical huge page number of the target entry is obtained by rounding a quotient obtained after the real physical page number is divided by N, and the intra-physical-huge-page offset of the target entry is obtained by finding a remainder obtained after the real physical page number is divided by N; and if the virtual huge page number of the independent entry is the same as the virtual huge page number of the target entry, the physical huge page number of the independent entry is the same as the physical huge page number of the target entry, and a difference between the intra-virtual-huge-page offset of the independent entry and the intra-virtual-huge-page offset of the target entry is equal to a difference between the intra-physical-huge-page offset of the independent entry and the intra-physical-huge-page offset of the target entry, combine the independent entry and the target entry that are in the translation lookaside buffer into a target combination entry by using the first output end, wherein the target combination entry comprises a virtual huge page number, a bit vector field, and a physical huge page number, the virtual huge page number of the target combination entry is equal to the virtual huge page number of the independent entry, the physical huge page number of the target combination entry is equal to the physical huge page number of the independent entry, a value of a bit, corresponding to a virtual page corresponding to the first virtual address, in the bit vector field of the target combination entry is the predetermined value, a value of a bit, corresponding to a virtual page of the independent entry, in the bit vector field of the target combination entry is the predetermined value, and a page number of the virtual page of the independent entry is the sum of the product of the physical huge page number of the independent entry and N and the intra-physical-huge-page offset of the independent entry.

16. The processing chip according to claim 9, wherein the buffer control unit is configured to:

if N is 2 to the power M, and M is greater than or equal to 1, obtain a huge page number of the virtual address by shifting the virtual page number of the virtual address to the right by M bits; and/or, obtain an offset of the virtual address by capturing the last M bits of the virtual page number of the virtual address.

* * * * *